(12) United States Patent
Hilgers et al.

(10) Patent No.: US 12,246,762 B2
(45) Date of Patent: Mar. 11, 2025

(54) SYSTEM AND METHOD FOR RAIL SCANNING USING ELECTROMAGNETIC ENGINES

(71) Applicant: Hyperloop Technologies, Inc., Los Angeles, CA (US)

(72) Inventors: Andy Alexander Hilgers, Los Angeles, CA (US); Timothy Nicholas Leslie Lambert, Los Angeles, CA (US)

(73) Assignee: HYPERLOOP TECHNOLOGIES, INC., Los Angeles, CA (US)

( * ) Notice: Subject to any disclaimer, the term of this patent is extended or adjusted under 35 U.S.C. 154(b) by 245 days.

(21) Appl. No.: 17/790,754

(22) PCT Filed: Feb. 8, 2021

(86) PCT No.: PCT/US2021/017032
§ 371 (c)(1),
(2) Date: Jul. 4, 2022

(87) PCT Pub. No.: WO2021/162971
PCT Pub. Date: Aug. 19, 2021

(65) Prior Publication Data
US 2022/0379937 A1 Dec. 1, 2022

Related U.S. Application Data

(60) Provisional application No. 63/085,119, filed on Sep. 29, 2020, provisional application No. 63/050,751, (Continued)

(51) Int. Cl.
*B61L 15/00* (2006.01)
*B60L 13/08* (2006.01)
(Continued)

(52) U.S. Cl.
CPC .......... *B61L 15/0072* (2013.01); *B60L 13/08* (2013.01); *B61F 5/245* (2013.01); *B61H 7/08* (2013.01);
(Continued)

(58) Field of Classification Search
CPC ............ B61L 15/0058; B61L 15/0081; B61L 15/0072; B61L 23/04; B60L 13/08; B60F 5/245; B60H 7/08
See application file for complete search history.

(56) References Cited

U.S. PATENT DOCUMENTS 2,198,928 A 4/1940 Wehner
3,874,299 A 4/1975 Silva et al.
(Continued)

FOREIGN PATENT DOCUMENTS

DE 2541599 A1 3/1977
EP 3333043 A1 * 6/2018 ............... B61K 9/10
(Continued)

OTHER PUBLICATIONS

Krull, Hintze, and Luke "Eddycurrent Detection of Head Checks on the Gauge Corners of Rails: Recent Results" NDT.net vol. 7, No. 6, Jun. 2002, entire document cited.
(Continued)

*Primary Examiner* — George C Jin
(74) *Attorney, Agent, or Firm* — Seyfarth Shaw LLP

(57) ABSTRACT

A system and method for scanning and evaluating a portion of rail operable for travel by a wheeled bogie having a plurality of electromagnetic engines. The electromagnetic engines are generally operable to generate an electromagnetic field that is operable to penetrate a rail. A resulting eddy current may be generated that is further operable to penetrate the rail. As the electromagnetic engines travel along the rail, readings from the electromagnetic field and
(Continued)

resulting eddy current may be used to detect differences in the rail as measured with respect to a nominal rail. The defects detected may be head checks, cracks, corrosion, etc. Further, a treated rail section may be utilized to strengthen the rail itself without compromising non-destructive evaluation. The disclosed system and method may be embodied as a computer program product.

20 Claims, 34 Drawing Sheets

Related U.S. Application Data filed on Jul. 11, 2020, provisional application No. 63/028,551, filed on May 21, 2020, provisional application No. 62/978,293, filed on Feb. 18, 2020, provisional application No. 62/977,692, filed on Feb. 17, 2020, provisional application No. 62/976,128, filed on Feb. 13, 2020.

(51) Int. Cl.
  *B61F 5/24* (2006.01)
  *B61H 7/08* (2006.01)
  *B61F 9/00* (2006.01)
(52) U.S. Cl.
  CPC ....... *B61L 15/0058* (2024.01); *B61L 15/0081* (2013.01); *B60L 2200/26* (2013.01); *B61F 9/005* (2013.01)

(56) References Cited

U.S. PATENT DOCUMENTS

| | | | |
|---|---|---|---|
| 3,911,829 A | 10/1975 | Ross et al. | |
| 3,941,062 A | 3/1976 | Machefert-Tassin | |
| 4,041,877 A | 8/1977 | Simon et al. | |
| 4,519,329 A | 5/1985 | Vacher | |
| 4,920,893 A | 5/1990 | Maupu | |
| 9,254,851 B2* | 2/2016 | Crocker | G01N 27/9006 |
| 9,849,895 B2* | 12/2017 | Mesher | B61L 23/04 |
| 10,362,293 B2* | 7/2019 | Mesher | H04N 13/189 |
| 10,807,623 B2* | 10/2020 | Mesher | G01S 19/45 |
| 11,035,827 B2* | 6/2021 | Friend | G01N 29/11 |
| 11,333,635 B2* | 5/2022 | Kocur | G01N 29/043 |
| 11,774,406 B2* | 10/2023 | Pagano | B61K 9/08 |
| | | | 73/598 |
| 2001/0035107 A1 | 11/2001 | Henderson | |
| 2007/0044676 A1 | 3/2007 | Clark et al. | |
| 2016/0009196 A1 | 1/2016 | Allard | |
| 2016/0144873 A1 | 5/2016 | Atmur et al. | |
| 2016/0304104 A1* | 10/2016 | Witte | B61L 23/044 |
| 2018/0186389 A1 | 7/2018 | Hosseini | |
| 2019/0031045 A1 | 1/2019 | Usman et al. | |
| 2024/0085255 A1* | 3/2024 | Platini | B61L 27/53 |

FOREIGN PATENT DOCUMENTS

| | | |
|---|---|---|
| GB | 1200201 A | 7/1970 |
| GB | 1494120 A | 12/1977 |
| GB | 2477109 A | 7/2011 |
| GB | 2477109 B | 2/2018 |
| KR | 20110036445 A | 4/2011 |
| WO | 2011152592 A1 | 12/2011 |

OTHER PUBLICATIONS

Liu et al., "Electromagnetic Tomography Rail Defect Inspection," IEEE Transactions of Magnetics, vol. 51, No. 10, dated Oct. 2015, retrieved online on May 17, 2021, entire document cited.
Ma et al., "Design and Analysis of the Hybrid Excitation Rail Eddy Brake System of High-Speed Trains" Journal of Zhejiang University, ISSN 1673-565X, dated Dec. 2011, Retrieved May 17, 2021, entire document cited.
Magel, Eric E et al., A Practical Approach to Controlling Rolling Contact Fatigue in Railways, 2005, 8th International Heavy Haul Conference, entire document cited.
PCT IPEA/408 Written Opinion of International Preliminary Examining Authority, PCT/US2021/017025, dated Sept. 9, 2021, entire document cited.
PCT IPEA/408 Written Opinion of International Preliminary Examining Authority, PCT/US21/17029, dated Jul. 30, 2021, entire document cited.
PCT IPEA/408 Written Opinion of International Preliminary Examining Authority, PCT/US21/17032, dated Jul. 30, 2021, entire document cited.
PCT IPEA/409 International Preliminary Report on Patentability Chapter II, PCT/US2021/017025, dated May 13, 2022, entire document cited.
PCT IPEA/409 International Preliminary Report on Patentability Chapter II, PCT/US21/17029, dated May 12, 2022, entire document cited.
PCT IPEA/409 International Preliminary Report on Patentability Chapter II, PCT/US21/17032, dated May 31, 2022, entire document cited.
PCT ISA/210 International Search Report, PCT/US2021/017025, dated Jul. 14, 2021, entire document cited.
PCT ISA/210 International Search Report, PCT/US21/17029, dated Jul. 8, 2021, entire document cited.
PCT ISA/210 International Search Report, PCT/US21/17032, dated May 20, 2021, entire document cited.
PCT ISA/237 Written Opinion of International Searching Authority, PCT/US2021/017025, dated Jul. 14, 2021, entire document cited.
PCT ISA/237 Written Opinion of International Searching Authority, PCT/US21/17029, dated Jul. 8, 2021, entire document cited.
PCT ISA/237 Written Opinion of International Searching Authority, PCT/US21/17032, dated May 20, 2021, entire document cited.

* cited by examiner

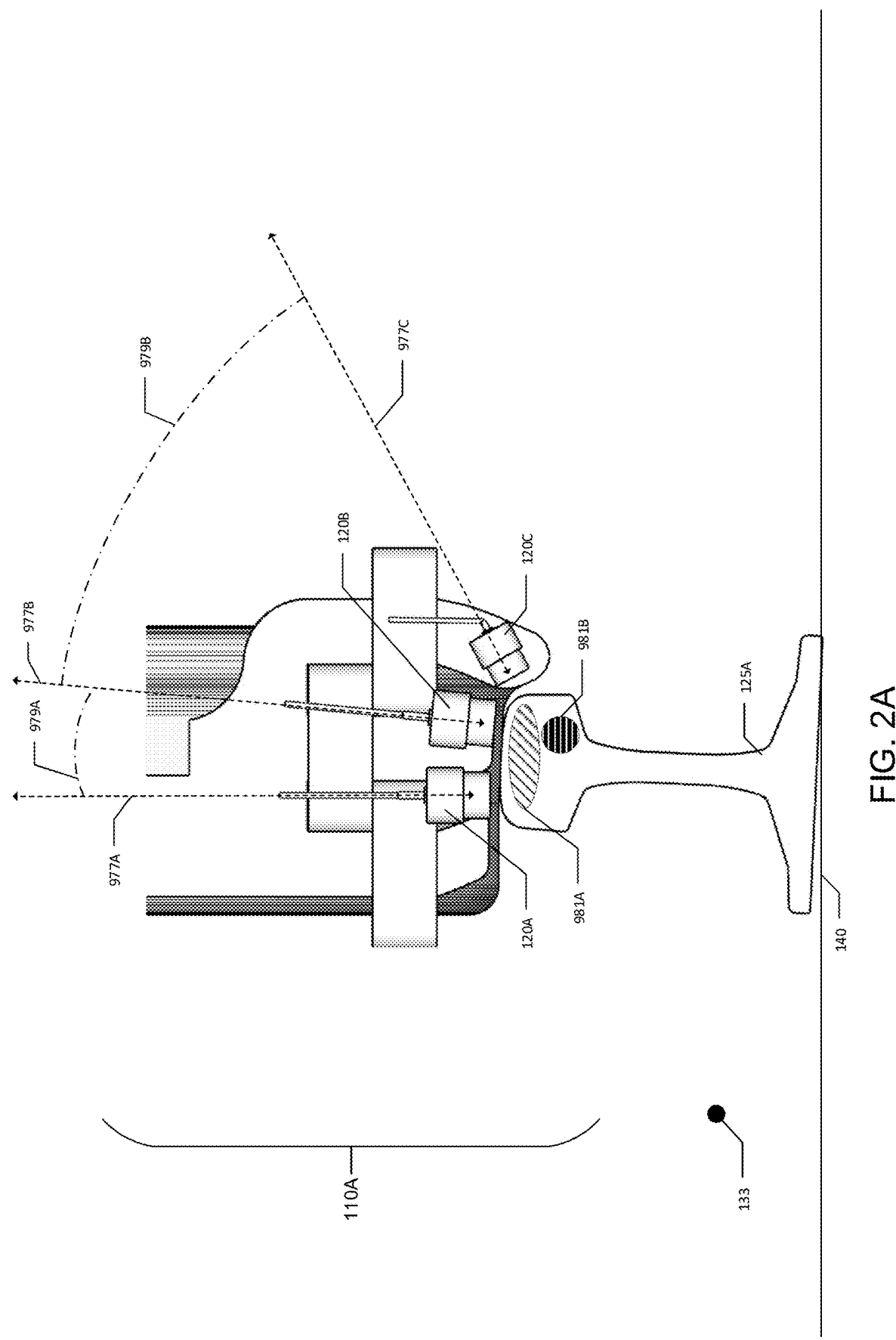

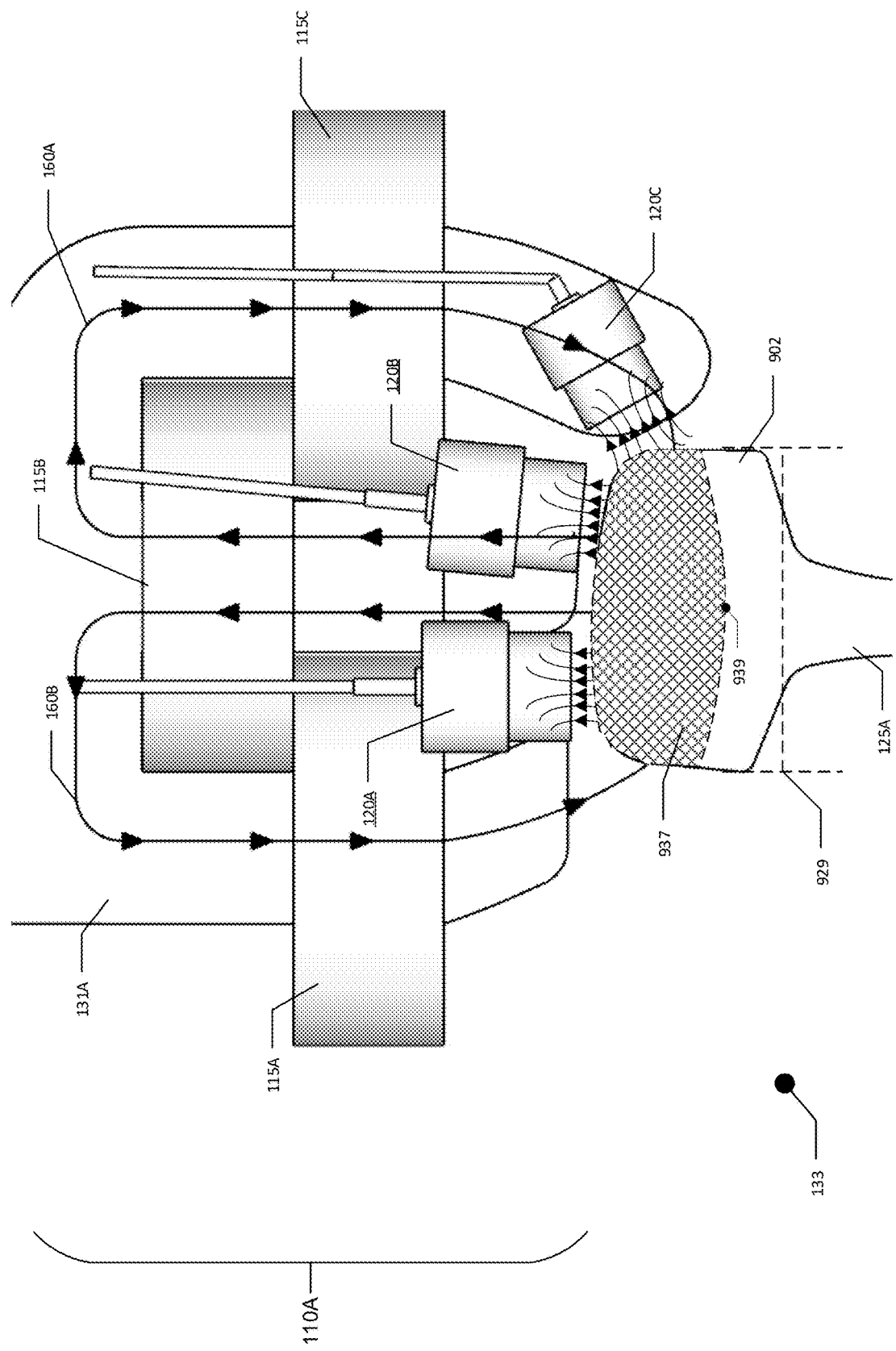

SYSTEM AND METHOD FOR RAIL SCANNING USING ELECTROMAGNETIC ENGINES

CROSS REFERENCE AND PRIORITY TO RELATED APPLICATIONS

This application claims the benefit of priority under 35 USC 119(e) to: U.S. Provisional No. 62/976,128 entitled "Systems and Methods for Guidance Control on Wheeled Bogie," filed on Feb. 13, 2020; U.S. Provisional No. 62/977,692 entitled "Systems and Methods for Guidance Control on Non-Moving Switch," filed on Feb. 17, 2020; U.S. Provisional No. 62/978,293 entitled "Systems and Methods for Inverted Electromagnetic Engine on Wheeled Bogie," filed on Feb. 18, 2020; U.S. Provisional No. 63/028,551 "Systems and Methods for Real-time Track Monitoring," filed on May 21, 2020; U.S. Provisional No. 63/050,751 entitled "Systems and Methods for Rail Inspection Using Eddy Currents," filed on Jul. 11, 2020; U.S. Provisional No. 63/085,119 entitled "System and Method for a Treated Rail for Rolling Stock," filed on Sep. 29, 2020. Further, this application claims priority under 35 USC 371 to PCT Application No. PCT/US21/17032 entitled "System and Method for Rail Scanning Using Electromagnetic Engines," filed on Feb. 8, 2021. All the aforementioned applications are hereby incorporated by reference in their entirety.

BACKGROUND

Railways suffer from damage and degradation from many sources including weather, corrosion, seismic activity, chemical exposure, failed maintenance, metal fatigue, etc. When failures occur, the industry relies on human technicians to identify and cure problems. However, physical examination with the naked eye is both costly and ineffective, especially when attempting to detect latent defects or failures deep within the rail itself. While human technicians may possibly use specialized equipment to detect such defects, the problem of scalability and cost still looms since railways span thousands of kilometers and cannot be easily checked by human technicians. Even if a failure can be detected, human technicians still require adequate information prior to engaging in a restoration effort because replacement and repair of railway infrastructure is costly, both in actual repair costs as well as operator costs due to reduced operation.

In general, the sooner a problem can be detected, the more easily and cost-effectively can said problem be ameliorated. Further, detecting problems with more precision allows for swifter and more efficient correction of problems. Often, railway operators must wait until the defect or failure in the rail manifests itself as a large enough problem to even be addressed. When the problem has been addressed, existing technology provides inadequate means to monitor and assess the efficacy of the repair without performing follow-up examinations, which may be insufficient in themselves. Further, many examination techniques rely on physically invasive examination which only damages the very rail which the operator would like to repair and maintain.

What is needed is a system and method for rail scanning using electromagnetic engines.

SUMMARY

A system and method are disclosed for rail scanning using an electromagnetic engine. The electromagnetic engine may be mounted on a wheeled bogie assembly that is configured to operate on a rail. The electromagnetic engine may comprise a plurality of electromagnetic coils that may be operable to generate an electromagnetic field that may penetrate the rail. The electromagnetic engine may further comprise a first electromagnetic sensor being disposed along a first axis, a second electromagnetic sensor being disposed along a second axis, and a third electromagnetic sensor being disposed along a third axis. A controller may be operatively coupled to the electromagnetic engine and a memory. The controller may measure, at the first electromagnetic sensor, a first reading of the generated electromagnetic field and the generated eddy current, measure, at the second electromagnetic sensor, a second reading of the generated electromagnetic field and the generated eddy current, and measure, at the third electromagnetic sensor, a third reading of the generated electromagnetic field and generated eddy current. The controller may further triangulate the first reading, the second reading, and the third reading to form a first signature.

The electromagnetic engine may receive a first signal via an I/O system managed by the controller, where the first signal indicates that the controller is in a calibration mode. The controller may then store, in the memory, the first signature as a calibration signature, which may be generated from a nominal section of the rail and may be operable for comparison with a second signature. In one aspect, the storing may be performed on a cloud computing platform, remote from the electromagnetic engine.

The controller may further receive a second signal indicating that the controller is in an operation mode. Further, the controller may store the first signature as an operation signature that is generated from an operating section of the rail. The operating signature may be operable for comparison with a calibration signature. The controller may compare the operating signature with the calibration signature to form a third signature operable to classify a difference in the rail. In one aspect, the third signature is stored in memory. In another aspect, the difference may indicate a defect that is a head check, a crack, a deformation, a missing portion of material, a missing clip, a damaged clip, a longitudinal profile defect, or combination thereof.

The electromagnetic sensor may be a Hall-effect sensor, an electromagnetic coil, a magneto-resistive device, or combination thereof. In one aspect, the rail may have a treated portion being disposed proximal to the rail head. The treated portion may be of a different metallurgical profile than a second portion of the rail that is different from the treated portion. The treated portion may be manufactured by heat treatment, metal alloying, mechanical treatment, or combination thereof. The treated portion may be associated with a real-world location. The controller may further detect the treated portion having a real-world location associated therewith and store additional data related to the detection of the treated portion having a real-world location associated therewith. Such additional data may include time, velocity of the electromagnetic engine, or combination thereof.

In one aspect, the treated portion may contain a plurality of glyphs associated with a message. The message may be associated with information related to the operation of the wheeled bogie assembly on the rail. In one aspect, the first electromagnetic sensor, the second electromagnetic sensor, and the third electromagnetic sensor may be collectively disposed in an array, which may be substantially lateral to a direction of travel along the rail. In one aspect, the controller is further operable to form a time-based image of the rail based on measurements gathered by the array of electromagnetic sensors.

A method for an electromagnetic engine configured to being mounted on a wheeled bogie assembly is disclosed. The wheeled bogie assembly may be configured to operate on a rail. The method may control a plurality of electromagnetic coils that are operable to generate an electromagnetic field. Said electromagnetic field may be operable to penetrate the rail and also operable to generate an eddy current when the electromagnetic engine is in motion. The method may control a first electromagnetic sensor, the first electromagnetic sensor being disposed along a first axis. The method may further control a second electromagnetic sensor disposed along a second axis. In addition, the method may control a third electromagnetic sensor disposed along a third axis.

In one aspect, the method may measure, at the first electromagnetic sensor, a first reading of the generated electromagnetic field and the generated eddy current, may measure, at the second electromagnetic sensor, a second reading of the generated electromagnetic field and the generated eddy current, and may measure, at the third electromagnetic sensor, a third reading of the generated electromagnetic field and the generated eddy current. The method may further triangulate the first reading, the second reading, and the third reading to form a first signature.

The method may receive, at an I/O system, a first signal, which indicates a calibration mode. The method may store, in a memory, the first signature as a calibration signature, which may be generated from a nominal section of the rail and may be operable for comparison with a second signature. In one aspect, the method may store information in a cloud computing platform that is remote from the electromagnetic engine. The method may receive a second signal that may indicate an operation mode. The method may store, in a memory, the first signature as an operation signature, that may be generated from an operating section of the rail and may be operable for comparison with a calibration signature. The method may compare the operation signature with the calibration signature to form a third signature operable to classify a difference in the rail. The method may store, in a memory, the third signature.

The method may determine that the difference is a defect, which may be a head check, a crack, a deformation, a missing portion of material, a missing clip, a damaged clip, a longitudinal profile defect, or combination thereof. The method may utilize an electromagnetic sensor that is a Hall-effect sensor, an electromagnetic coil, a magneto-resistive device, or combination thereof.

The method may detect a treated portion of the rail, that may have a different metallurgical profile than a second portion of the rail. The treated portion may further have a real-world location associated therewith. The method may store in a memory, additional data related to the detection of the treated portion having a real-world location associated therewith, and such additional data may include time, velocity of the electromagnetic engine, or combination thereof. In one aspect, the method may detect a plurality of glyphs as being part of the treated portion and being associated with a message. Said message may be associated with information related to the operation of the wheeled bogie assembly on the rail. The method may generate a time-based image of the rail based on measurements gathered by an array of electromagnetic sensors wherein the first electromagnetic sensor, the second electromagnetic sensor, and the third electromagnetic sensor are collectively disposed in an array that is substantially lateral to a direction of travel along the rail. A computer program product may contain instructions that substantially embody the methods described herein, and said instructions may cause a computer to perform operations corresponding to the methods.

BRIEF DESCRIPTION OF THE DRAWINGS

The accompanying drawings, which are incorporated herein and constitute part of this specification, illustrate exemplary aspects of the claims, and together with the general description given above and the detailed description given below, serve to explain the features of the claims.

FIG. 2A illustrates a planar view of an electromagnetic engine, as shown from a front perspective.

FIG. 5E illustrates a planar view of an electromagnetic engine, as shown from a front perspective.

DETAILED DESCRIPTION

Figure 1A:
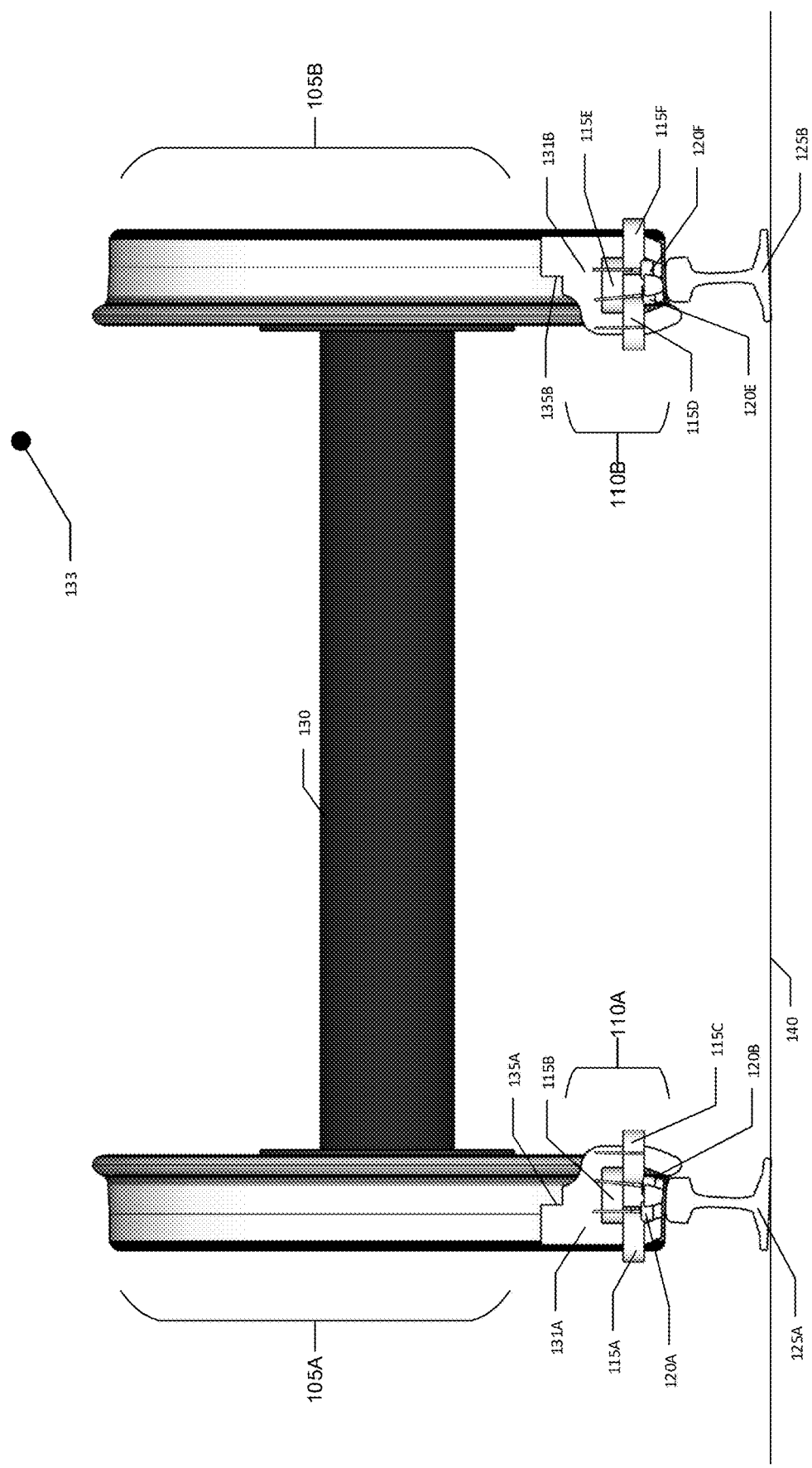
FIG. 1A illustrates a planar view of a wheeled bogie assembly, shown from a front perspective.

Various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Rails are prone to damage from a number of factors, any of which may lead to a catastrophic failure of the related transportation system. Rolling contact fatigue ("RCF") is considered to be the predominant cause of crack initiation and crack propagation in the rail. Many factors contribute to RCF including: environmental conditions, rail profiles, wheel profiles, track curvatures, grades, lubrication practices, rail metallurgy, track geometry errors, excessive weight of vehicles, vandalism, electrolysis, corrosion, etc. To the extent that such factors can be mitigated, RCF may be minimized.

Surface crack initiation may result from wheel contact that plastically deforms the steel of the rail in the directions of applied tractions. As the deformation increases, the surface "ratchets" until the available ductility of the steel is exhausted. A surface crack results from the fracturing steel.

Once a surface crack develops, crack propagation may increase the area of surface negatively affected. Some steel may resist crack propagation better than others. However, wheel grease and other contaminants may enter the surface crack and reduce the steel's resistance to surface cracking. Water has a low viscosity and high surface tension and is therefore drawn down into cracks by a capillary action. One driving force behind the crack tip beyond the surface is hydraulicing. In the presence of water, hydralicing can cause a crack to propagate through the entire cross section of rail. Therefore, crack prevention is key.

At some point, RCF may no longer be considered the cause of the degradation of the rail because the damage is too far below the contact surface. However, degradation of the steel may continue due to: thermal stresses (e.g., tensile stress in cold conditions), bending stress due to wheel load, residual stress from the rail manufacturing process, etc. In sum, RCF may be the cause of severe and irreversible damage requiring a complete replacement of entire sections of rail.

Rail clips fasten a rail to a sleeper (or railway tie), which provides the support to each of the rails. Rail clips wear and break like any other physical component in rail-based transportation systems. Determining the presence of damaged rail clips often requires manual inspection by human workers. Such inspection methods are expensive and unreliable, as is often the case with human-based maintenance solutions. Further, rail clips are numerous and have many smaller components that may hide defects (e.g., washers beneath bolts).

Rail defects are often not capable of being seen by the naked eye. Even with solutions based on ultrasound, defects near the surface may be laminated over other defects found deeper in the material. Further, utilizing handheld equipment to detect latent defects creates additional costs, increases inaccuracy, physical risk to human operators, etc. Another issue with non-electromagnetic-based detection is the inability to operate in inclement weather. For instance, rain may cause the surface of the rail to be inoperable for visual and/or ultrasonic inspection.

The solution to the aforementioned problems is a system and method for rail inspection and evaluation using magnetic fields and eddy currents. The disclosed solution provides an electromagnetic engine operable to detect defects in rail-based tracks. Further, the disclosed solution is operable to being used while the bogie is in motion. Operation in motion increases coverage of inspections without unduly increasing maintenance costs, given that the bogie consistently travels the rail. The operation of the disclosed solution may also provide accurate location determination to enhance the operation of the rail-based transportation system.

FIG. 1A illustrates a planar view of a wheeled bogie assembly 100, shown from a front perspective. The wheeled bogie assembly 100 comprises an axle 130, a first wheel assembly 105A, a second wheel assembly 105B, a first electromagnetic engine 110A, and a second electromagnetic engine 110B. The wheeled bogie assembly 100 may be positioned on a first rail 125A and a second rail 125B. In one aspect, the rails 125A, 125B may be a standard-gauge railway with a track gauge of 1,435 mm, often referred to as the Stephenson gauge. As shown, the rails 125A, 125B are flat-bottom rails which are commonly used in the United States. One of skill in the art will appreciate that other rail profiles may be utilized and be similarly operable for travel with the wheel assemblies 105A, 105B, including those substantially connected to the electromagnetic engines 110A, 110B. The rails 125A, 125B may be disposed on a rail support 140 (e.g., the ground).

A direction of travel ray 133 is depicted as a dot because the wheeled bogie assembly 100 is traveling toward the viewer. The ray 133 shall be used throughout this disclosure to enable the viewer to determine the direction of travel and orientation of the figures. When a dot is utilized herein for the ray 133, the wheeled bogie assembly 100 is traveling toward the viewer unless otherwise noted.

The first electromagnetic engine 110A and the second electromagnetic engine 110B may be disposed in front of the wheel assemblies 105A, 105B, respectively. The electromagnetic engines 110A, 110B may however be similarly disposed behind the wheel assemblies 105A, 105B, depending on commercial need, design considerations, operating environments, etc. Further, a bogie typically has a plurality of wheelsets; therefore, the electromagnetic engines 110A, 110B may be distributed between several wheelsets (including before and after the wheelsets). For clarity, one wheelset is shown in the instant figure. In one aspect, the electromagnetic engines 110A, 110B may be disposed on the locomotive and/or on the rear car in order to save deployment costs i.e., one to two points of inspection may be sufficient for some commercial applications.

The electromagnetic engine 110A comprises a steel core 131A with three prongs. The steel core 131A has an outer electromagnetic coil 115A, a center electromagnetic coil 115B, and an inner electromagnetic coil 115C. The center prong of the steel core 131A separates the coils 115A, 115C. The coil 115B is disposed higher than the coils 115A, 115C. Further, the coil 115B partially overlaps with the coils 115A, 115C, where the overlap is the result of the coil 115B being disposed higher. As shown in the instant figure, the overlap of the coil 115B is approximately one-third the width (or diameter) of the coil 115A as measured from the outer edge of the coil 115B. Likewise, the coil 115B is overlapping with the coil 115C by approximately one-third the width (or diameter) of the coil 115B. One of skill in the art will appreciate that the overlap may vary slightly without deviating from the intended purpose of the coils 115A, 115B, 115C. In a similar manner to the electromagnetic engine 110A, the electromagnetic engine 110B may have a steel core 131B with an inner coil 115D, a center coil 115E, and an outer coil 115F. One of skill in the art will appreciate that the coils 115D, 115E, 115F are configured according to the symmetry of the bogie assembly 100.

In an alternative embodiment, the electromagnetic engine 110A may be comprised of the coils 115A, 115C, disposed on steel core 131A. Likewise, the electromagnetic engine 110B may be comprised of the coils 115D, 115F, disposed on the steel core 131B. Such an alternative embodiment may enable use of a two-coil design, respectively for each of the electromagnetic engines 110A, 110B.

The coils 115A, 115B, 115C, 115D, 115E, 115F provide an excitation source to generate an electromagnetic field at a certain frequency. This frequency may be zero if it is desired, such that the electromagnetic engines 110A, 110B produce a constant field. Further, the electromagnetic engines 110A, 110B may be moved by the wheeled bogie assembly 100, such that the electromagnetic field is caused to move as well. Such a moving electromagnetic field may further be described as having a frequency as a result of such movement. Such an electromagnetic field may permeate the rails 125A, 125B, as governed by the laws of electromagnetism. The depth of electromagnetic field permeation is a function of the frequency of the field, the permeability of the material, and the conductivity of the material.

The electromagnetic engine 110A further comprises a first electromagnetic sensor 120A, a second electromagnetic sensor 120B, and a third electromagnetic sensor 120C (obstructed in the instant view). The electromagnetic sensors 120A, 120B, 120C are generally operable to detect the presence and strength of magnetic fields and fluxes, which may further be used to estimate magnetic forces. In one aspect, the detected magnetic force may be the result of generated electromagnetic force resulting from the excitement of the electromagnetic coils 115A, 115B, 115C.

The electromagnetic sensors 120A, 120B, 120C may take many implementations in the commercial deployment of the electromagnetic engine 110A. In one aspect, the electromagnetic sensors 120A, 120B, 120C may be implemented using electromagnetic coils, which provide the advantage of being relatively elegant in design. In another aspect, Hall-effect elements may be utilized as the electromagnetic sensors 120A, 120B, 120C. Hall-effect elements provide the advantage of relatively precise areas of measurement. In yet another aspect, the electromagnetic sensors 120A, 120B, 120C may be implemented using magneto-resistive devices. Each of the various implementations of the electromagnetic sensors 120A, 120B, 120C have advantages and disadvantages, all of which one of skill in the art will balance given the intended commercial deployment.

In one aspect, the sensors 120A, 120B, 120C may be individual computing devices capable of measuring, storing, and processing real-world measurements. In another aspect, the sensors 120A, 120B, 120C may be connected to a computer or controller operable to measure, store, and process the real-world measurements observed by the sensors 120A, 120B, 120C.

The electromagnetic engine 110B comprises a steel core 131B with three prongs. The steel core 131B has an inner electromagnetic coil 115D, a center electromagnetic coil 115E, and an outer electromagnetic coil 115F. The coils 115D, 115E, 115F are substantially similar to the coils 115A, 115B, 115C. The electromagnetic engine 110B further comprises a first electromagnetic sensor 120D (obstructed in the instant view), a second electromagnetic sensor 120E, and a third electromagnetic sensor 120F. The sensors 120D, 120E, 120F may be substantially similar to the sensors 120A, 120B, 120C.

One of skill in the art will appreciate that the second electromagnetic engine 110B is a symmetrical instance of the first electromagnetic engine 110A, with a difference being that the electromagnetic engine 110B is configured for the rail 125B. One of skill in the art will further appreciate that the electromagnetic engines 110A, 110B may or may not be disposed in parallel. Therefore, in one aspect, either one of the electromagnetic engines 110A, 110B may not be present in the wheeled bogie assembly 100.

A surface 135A may be present on the steel core 131A. Likewise, a surface 135B may be present on the steel core 131B. The surfaces 135A, 135B are generally operable to provide a calibrated distance between the electromagnetic engines 110A, 110B. In one aspect, the calibrated distance may be utilized to generate a signature related to a substantially ideal track gauge.

Figure 1B:
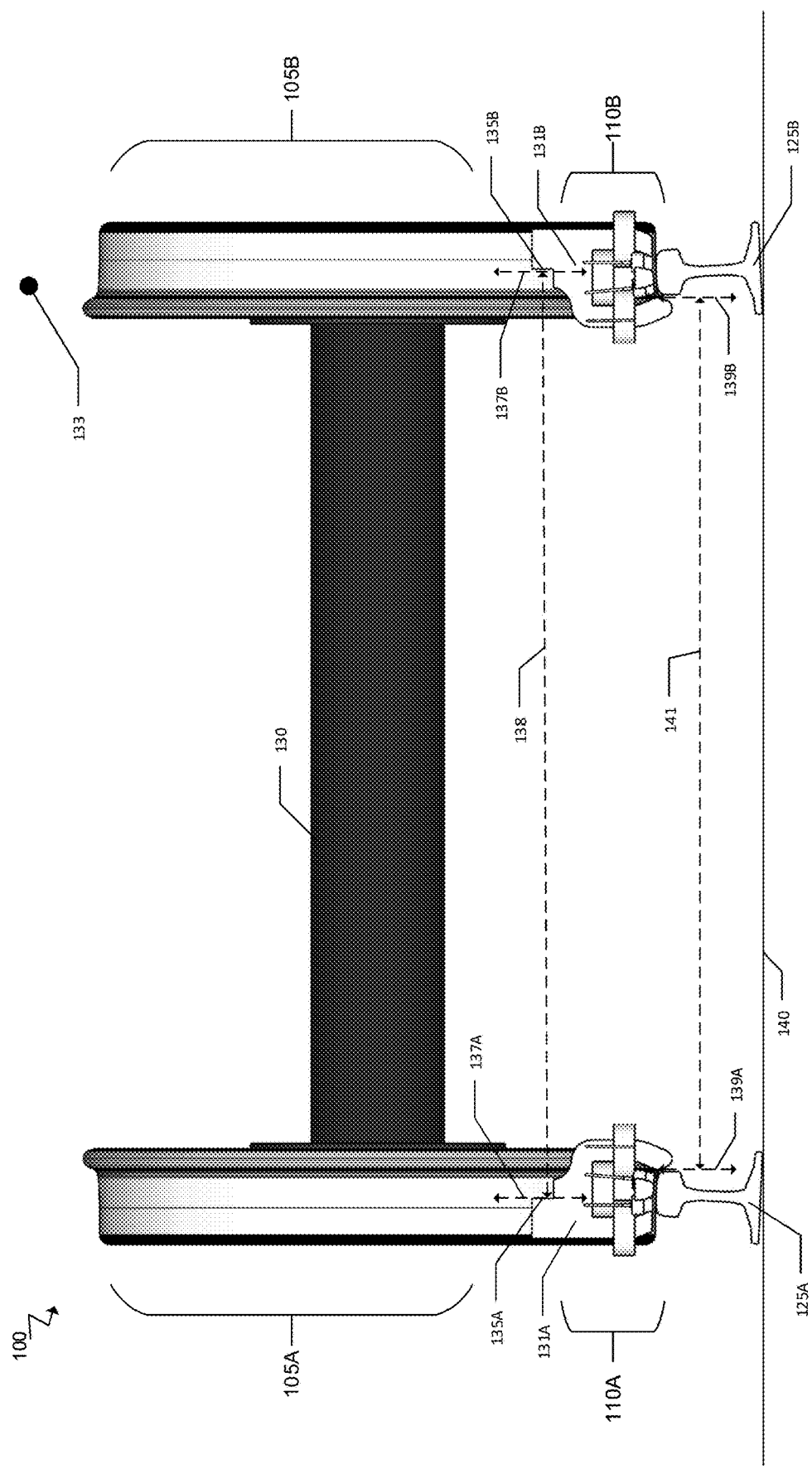
FIG. 1B illustrates a planar view of a wheeled bogie assembly, shown from a front perspective.

FIG. 1B illustrates a planar view of the wheeled bogie assembly 100, shown from a front perspective. The surfaces 135A, 135B are separated by a distance 138 defined by a left axis 137A and a right axis 137B. The distance 138 is generally utilized as a calibration means to detect deviations from a nominal distance between the rails 125A, 125B. For instance, the track gauge may be 1,435 mm. In operation, the distance 138 may be utilized in conjunction with the electromagnetic engines 110A, 110B to identify deviations from the nominal track gauge.

The distance 138 may be determined by operating the wheeled bogie assembly 100 over a segment of track that is substantially machined to be at or near the nominal distance desired (e.g., 1,435 mm). In the instant figure, a distance 141 is bounded by a left axis 139A and a right axis 139B. The distance 141 may be at or near the nominal distance of the track gauge. As stated, the distance 138 between the electromagnetic engines 110A, 110B may be utilized to determine deviations from the distance 141 as measured by the electromagnetic engines 110A, 110B. The distances 138, 141 may have some deviation from ideal distances, and such deviations may be accounted for by the electromagnetic engines 110A, 110B when deployed in commercial use (e.g., using an onboard controller)

Figure 1C:
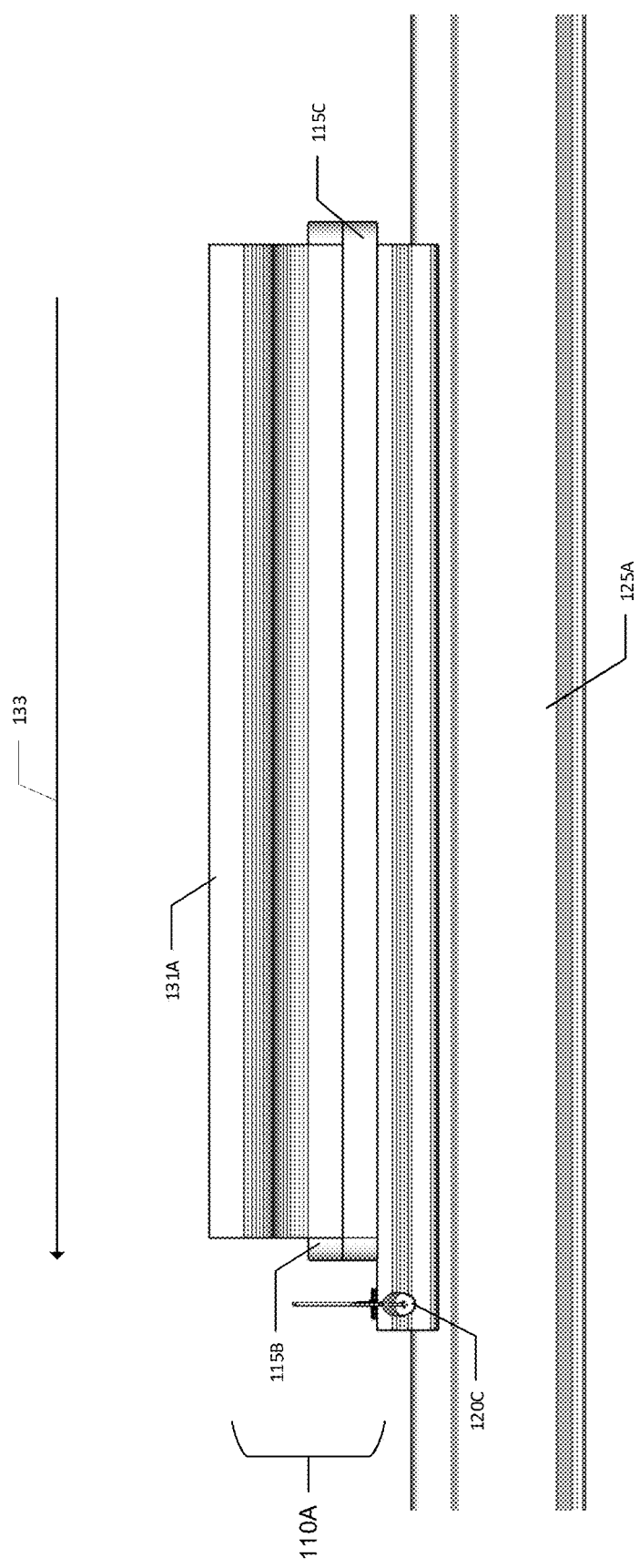
FIG. 1C illustrates a planar view of an electromagnetic engine, shown from a side perspective.

FIG. 1C illustrates a planar view of the electromagnetic engine 110A, shown from a side perspective. The electromagnetic sensor 120C is shown without obstruction in the instant figure. One of skill in the art will appreciate that the wheeled bogie assembly 100, in operation, would be traveling along the ray 133.

Figure 1D:
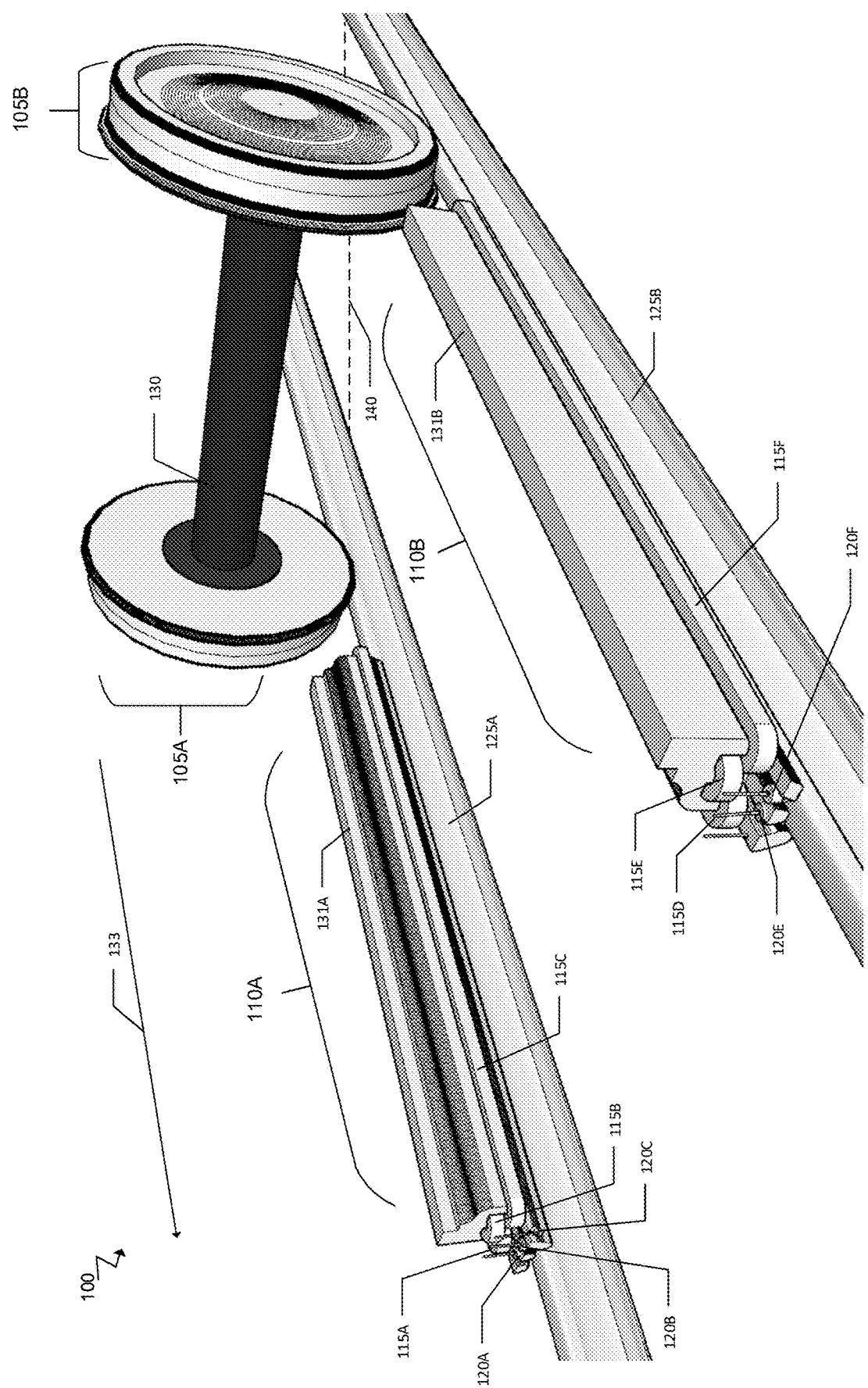
FIG. 1D illustrates a three-quarter perspective of a wheeled bogie assembly, as shown from a front perspective.

FIG. 1D illustrates a three-quarter perspective of the wheeled bogie assembly 100, as shown from a front perspective. One of skill in the art will appreciate that the wheeled bogie assembly 100 in operation would be traveling along the ray 133. In one aspect, the instant figure provides an example of a segment of track operable to generate a signature of ideal and/or desired conditions of track deployed in normal commercial use. Such ideal track segments may be calibrated and configured using methods and means not generally available in fielded track segments.

Figure 1E:
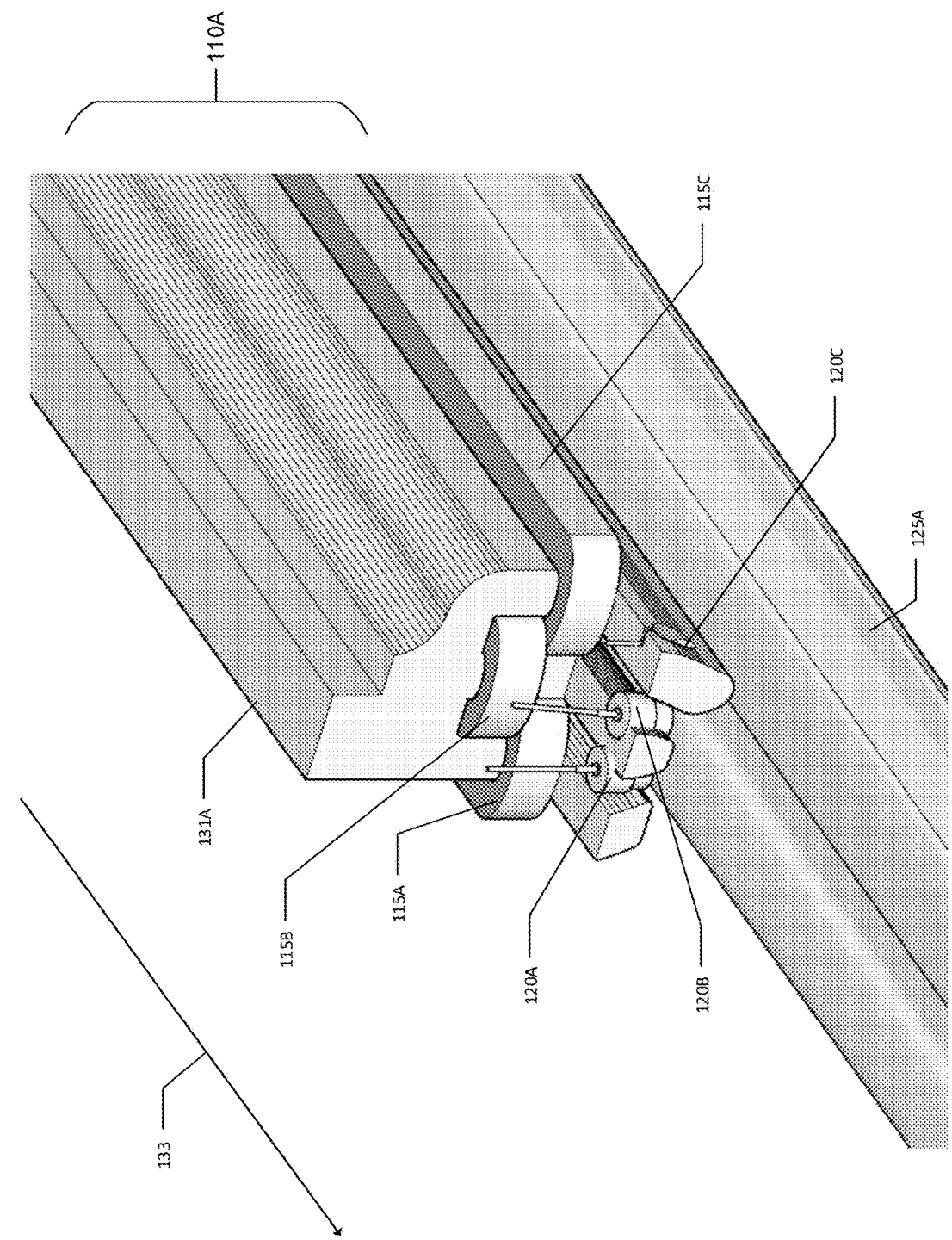
FIG. 1E illustrates a three-quarter perspective of an electromagnetic engine, as shown from a front perspective.

FIG. 1E illustrates a three-quarter perspective of the electromagnetic engine 110A, as shown from a front perspective. One of skill in the art will appreciate that the wheeled bogie assembly 100 in operation would be traveling along the ray 133.

Figure 1F:
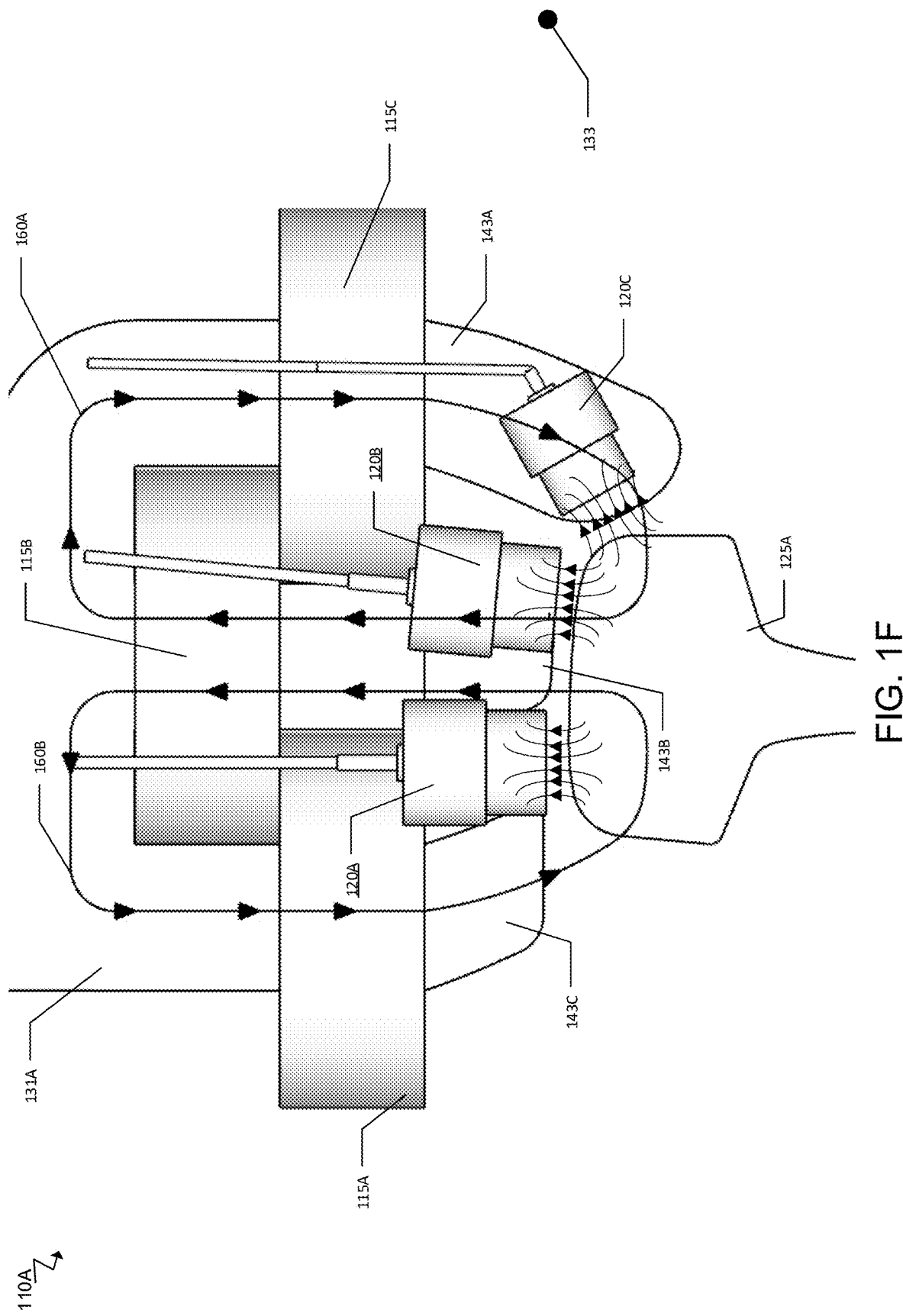
FIG. 1F illustrates a planar view of an electromagnetic engine, as shown from a front perspective.

FIG. 1F illustrates a planar view of the electromagnetic engine 110A, as shown from a front perspective. The steel core 131A comprises an inner prong 143A, a center prong 143B, and an outer prong 143C. The coils 115A, 115B, 115C may be disposed around an outer prong 143A, a center prong 143B, and an inner prong 143C, respectively. The inner prong 143A curves slightly toward the rail 125A to increase inner attractive force 160A which is reacted by the rail 125A. The inner attractive force 160A is generated by the prongs 143A, 143B when the coils 115B, 115C are excited.

The outer prong 143C is curved toward the head of the rail 125A. Similar to the prong 143A, the orientation of the prong 143C enables an outer magnetic force 160B to travel through the prongs 143B, 143C. Further, such orientation provides stronger electromagnetic force interaction while still following the profile of the wheel flange in the wheel assemblies 105A, 105B. The outer magnetic force 160B is generated by the prongs 143B, 143C as created by the coil 115A and the coil 115B.

The air gap between the rail 125A and the electromagnetic engine 110A is shown in the instant figure with more detail. One of skill in the art will appreciate the lack of physical contact between the rail 125A and the prongs 143A, 143B, 143C. One of skill in the art will further appreciate from the instant figure that the magnetic forces 160A, 160B represent flux produced by excitation of the coils 115A, 115B, 115C. Hence the flux is understood to flow substantially in a loop comprising at least two of the prongs in the electromagnetic engine 110A.

Figure 1G:
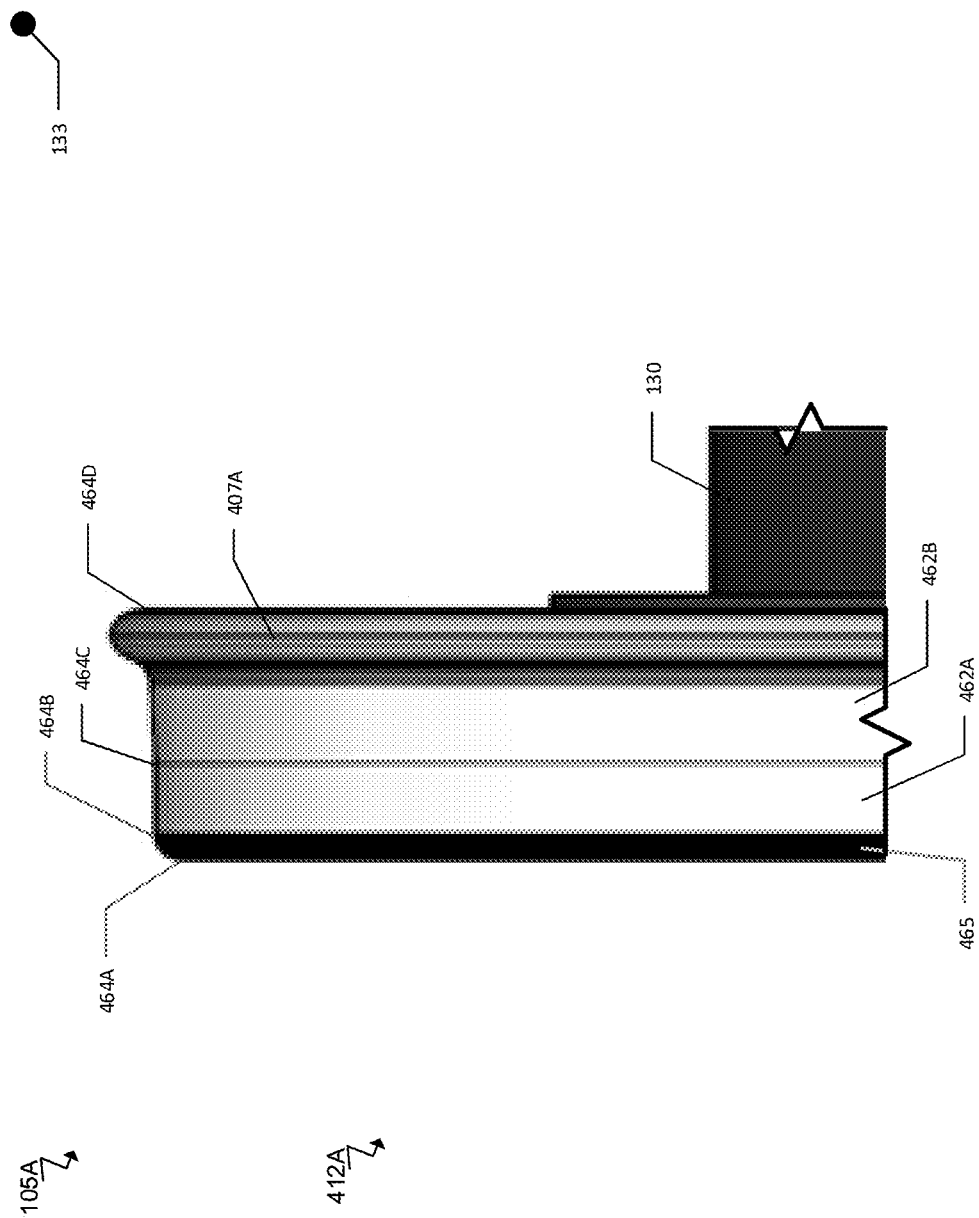
FIG. 1G illustrates a planar view of a wheel assembly, as shown from a front perspective.

FIG. 1G illustrates a planar view of the wheel assembly 105A, as shown from a front perspective. A wheel 412A has a flange 407A on the outboard side.

The wheel 412A is formed with a cylindrical section 462A and a conical section 462B. The cylindrical section 462A is defined between a diameter 464B and a diameter 464C. The cylindrical section 462A is substantially flat between the diameters 464B, 464C. The cylindrical section 462A may have a shrinking diameter 465, that leads to an outer diameter 464A on the field side of the wheel 412A. The conical section 462B is positioned between the diameter 464C and a diameter 464D. One of skill in the art will appreciate that the wheel assemblies 105A, 105B are substantially similar with respect to the design disclosed in the instant figure.

FIG. 2A illustrates a planar view of the electromagnetic engine 110A, as shown from a front perspective. The electromagnetic sensor 120A is disposed along an axis 977A. The electromagnetic sensor 120B is disposed along an axis 977B. The electromagnetic sensor 120C is disposed along an axis 977C. The axes 977A, 977B are separated by an angle 979A. Similarly, the axes 977B, 977C are separated an angle 979B.

The angles 979A, 979B provide a means by which a defect 981A and a defect 981B may be detected via triangulation. Each of the electromagnetic sensors 120A, 120B, 120C have varying orientation with respect to the rail 125A. Therefore, each of the electromagnetic sensors 120A, 120B, 120C may provide a substantially unique perspective of the defects 981A, 981B. As shown, the defect 981A may obscure the presence of the defect 981B when observed by conventional inspection systems based on visual light, ultrasound, X-ray, etc. When the defect 981B is viewed from the top down, the presence of the defect 981A may substantially obscure the defect 981B. However, the orientation of the electromagnetic sensors 120A, 120B, 120C provides a means by which the defect 981A as well as the latent defect 981B may be both (or alternately) detected. Even if one of the sensors 120A, 120B, 120C fails to have a clear viewing angle to a particular defect, the triangulation, provided by the sensors 120A, 120B, 120C, enables the detection of defects that are partially obscured from a particular viewing angle.

Figure 2B:
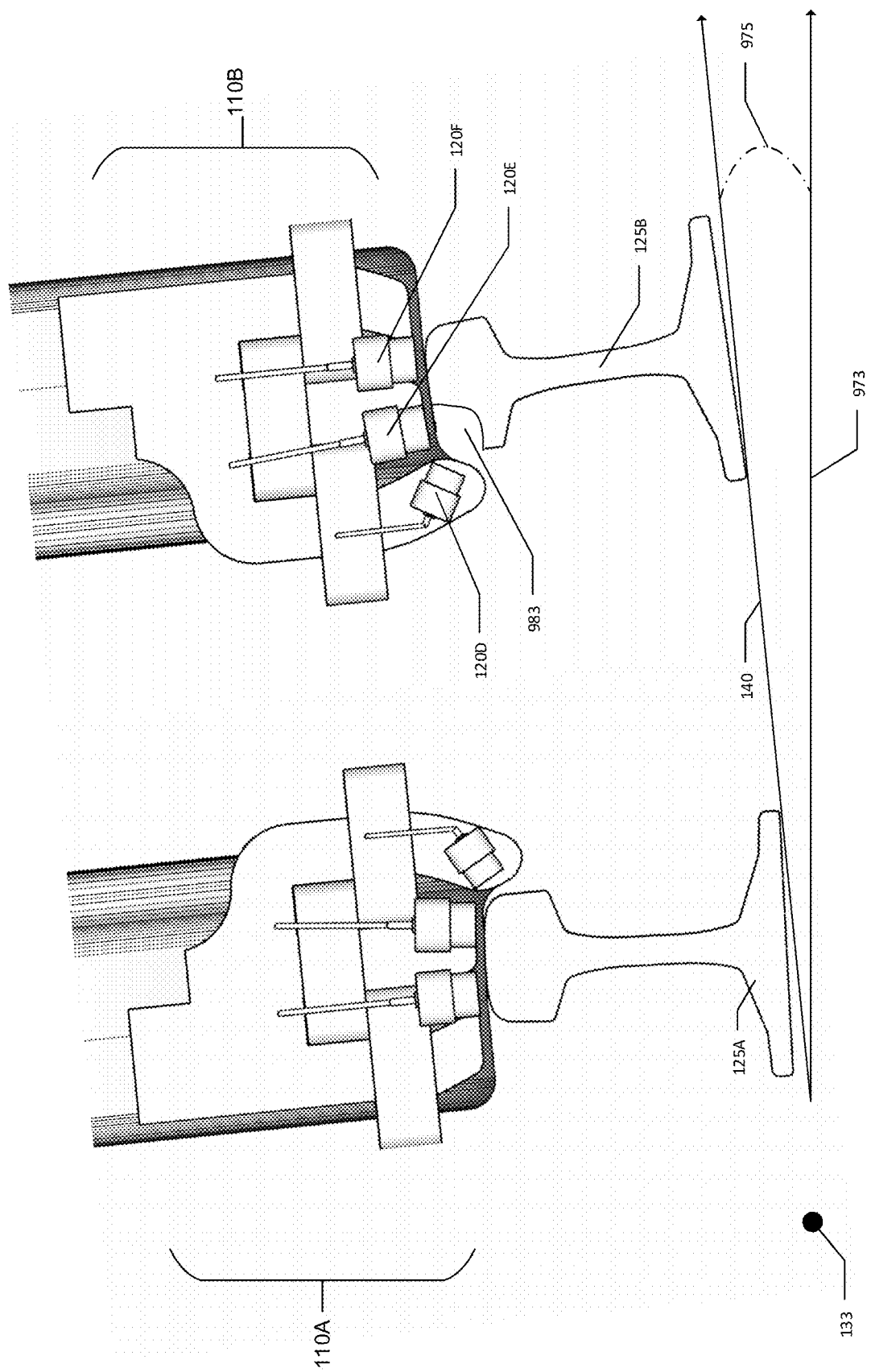
FIG. 2B illustrates a planar view of electromagnetic engines, as shown from a front perspective.

FIG. 2B illustrates a planar view of the electromagnetic engines 110A, 110B, as shown from a front perspective. The wheeled bogie assembly 100 is operating within a curved segment of track defined by an inclined plane 973 formed by a rail support 140 and an angle 975. The instant figure is presented without the axle 130 for convenience. Further, the electromagnetic engines 110A, 110B are likewise depicted more closely for convenience.

A head check defect 983 is shown on the rail 125B. The defect 983 may be the result of a segment of rail being completely destroyed or damaged such that the wheel assembly 105B is not maintaining contact with the rail 125B. As discussed, the electromagnetic sensors 120A, 120B, 120C, 120D, 120E, 120F may detect latent defects within the rail 125B as described herein. As shown in the instant figure, the electromagnetic sensors 120D, 120E, 120F may detect the presence of a patent defect such as the defect 983 where an entire segment of the rail 125B has been removed from the rail 125B.

The head check defect 983 may have a significant effect on the electromagnetic field generated by the coils 115A, 115B, 115C, 115D, 115E, 155F. The deviation from the nominal measurements may indicate at least the presence of a defect. The sensors 120A, 120B, 120C, 120D, 120E, 120F may provide more information related to the electromagnetic field given that triangulation may be used to obtain a more comprehensive evaluation of the defect.

Figure 3A:
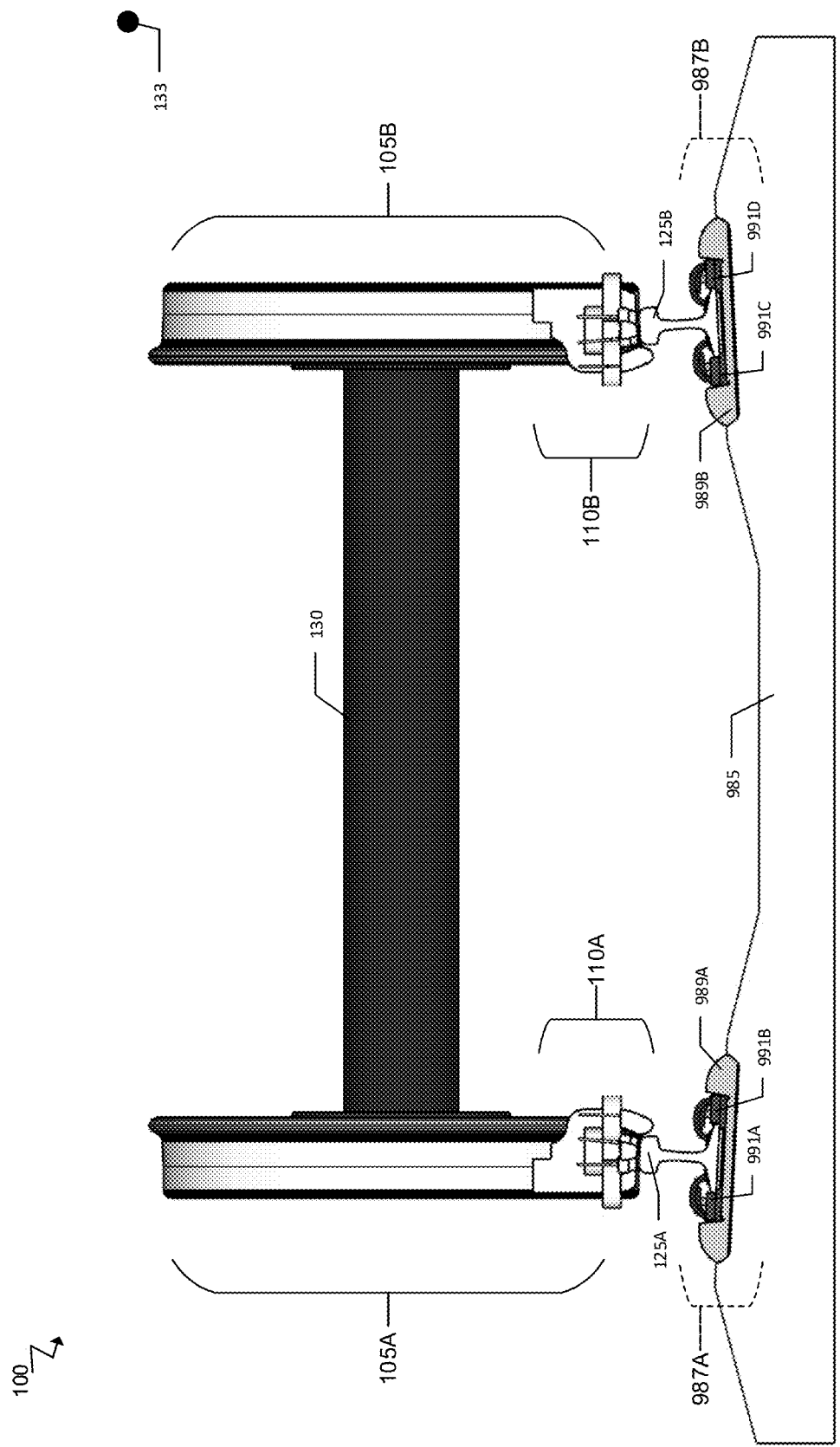
FIG. 3A illustrates a planar view of a bogie assembly, as shown from a front perspective.

FIG. 3A illustrates a planar view of the wheeled bogie assembly 100, as shown from a front perspective. A first clip assembly 987A and a second clip assembly 987B are disposed on a railway sleeper 985. The clip assembly 987A is comprised of a first clip 991A, a second clip 991B, and a support 989A. The clips 991A, 991B are generally operable to affix the rail 125A to the support 989A, which is in turn substantially affixed to the sleeper 985.

The clip assembly 987B is comprised of a first clip 991C, a second clip 991D, and a support 989B. The clip assembly 987B is substantially similar to the clip assembly 987A in function and capability. One of skill in the art will appreciate that the clip assembly 987B is mirrored with respect to the clip assembly 987A.

Figure 3B:
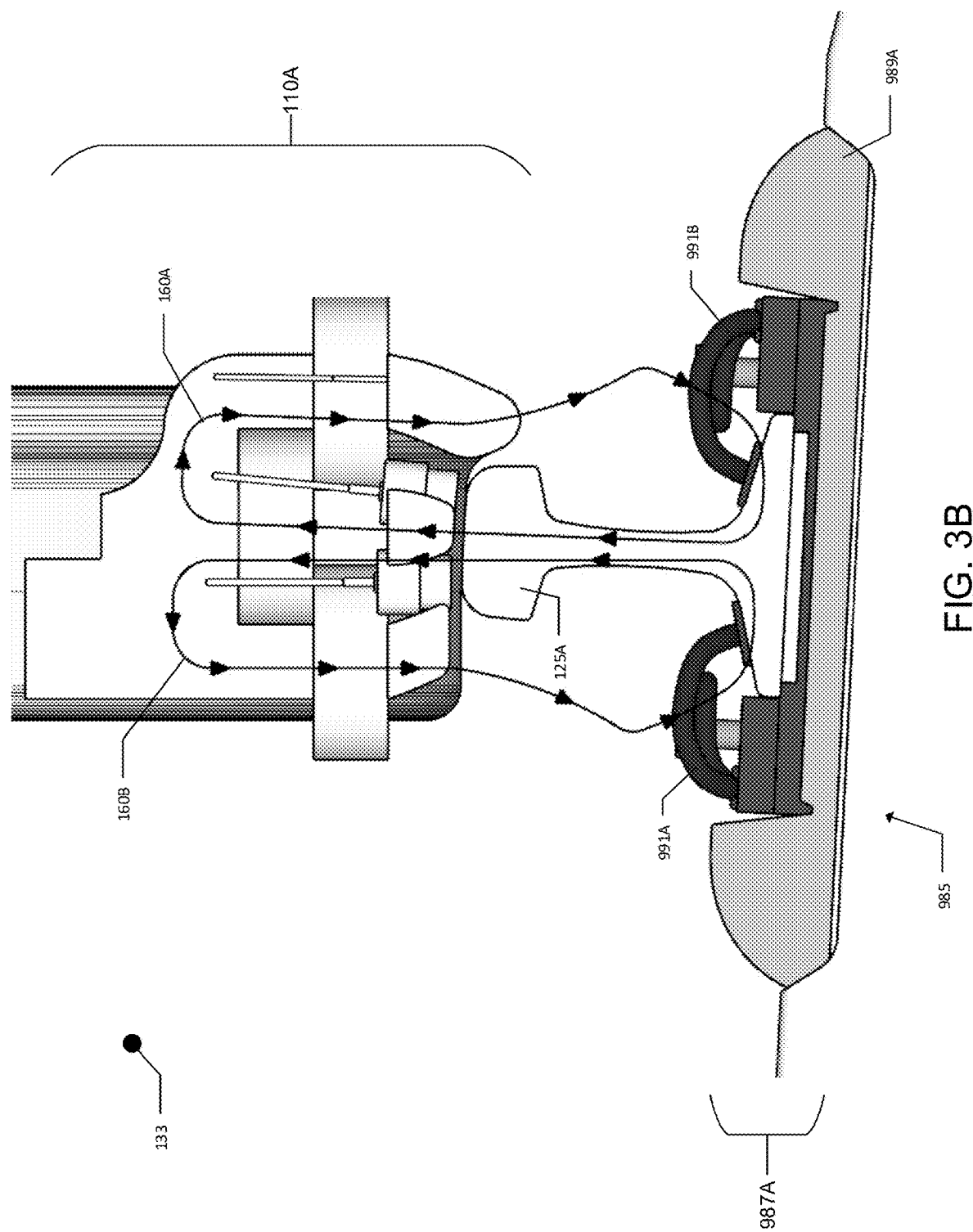
FIG. 3B illustrates a planar view of an electromagnetic engine, as shown from a front perspective.

FIG. 3B illustrates a planar view of the electromagnetic engine 110A, as shown from a front perspective. The attractive magnetic force 160B may generate a magnetic field and mediated flux, both of which pass through the clip 991A such that the electromagnetic sensors 120A, 120B, 120C may detect the presence or absence of the clip 991A. Likewise, the attractive magnetic force 160A may pass through the clip 991B such that the electromagnetic sensors 120A, 120B, 120C may detect the presence or absence of the clip 991B.

The clip assembly 987A is substantially free of defects. The electromagnetic engine 110A may be operated over a machined section of track that is likewise substantially free of defects in order to generate a signature of the magnetic forces detected by the electromagnetic sensors 120A, 120B, 120C. The clip assembly 987A may be one of many such clip assemblies present on the section of track utilized for generating a signature. In one aspect, the attractive forces 160A, 160B may be substantially similar to a signature corresponding to a desired state for detecting defects (or absence) of the clips 991A, 991B.

Figure 3C:
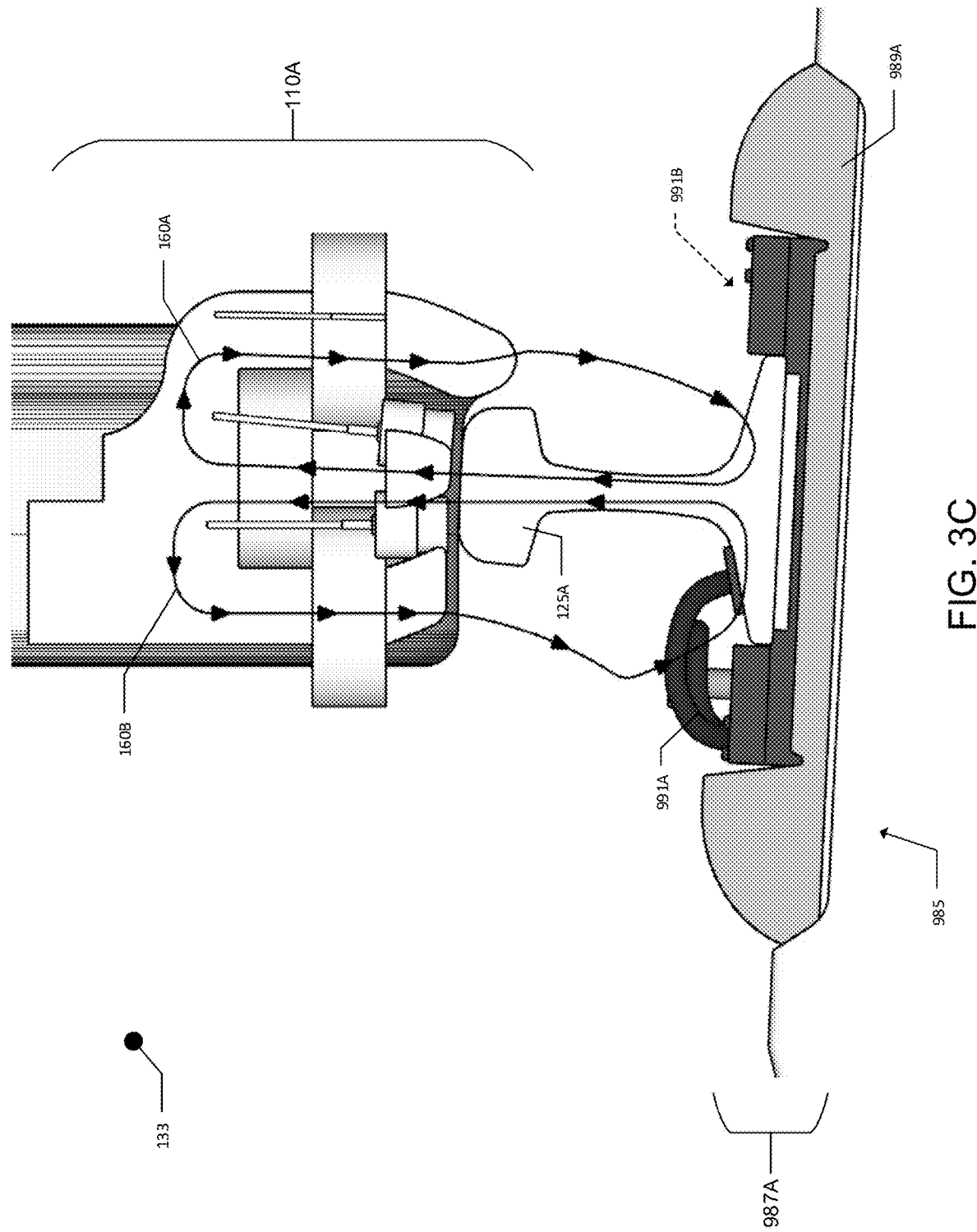
FIG. 3C illustrates a planar view of an electromagnetic engine, as shown from a front perspective.

FIG. 3C illustrates a planar view of the electromagnetic engine 110A, as shown from a front perspective. The clip 991B is missing in the instant figure. As such, the attractive force 160A deviates from the nominal attractive force, thus indicating the presence of a defect.

Figure 3D:
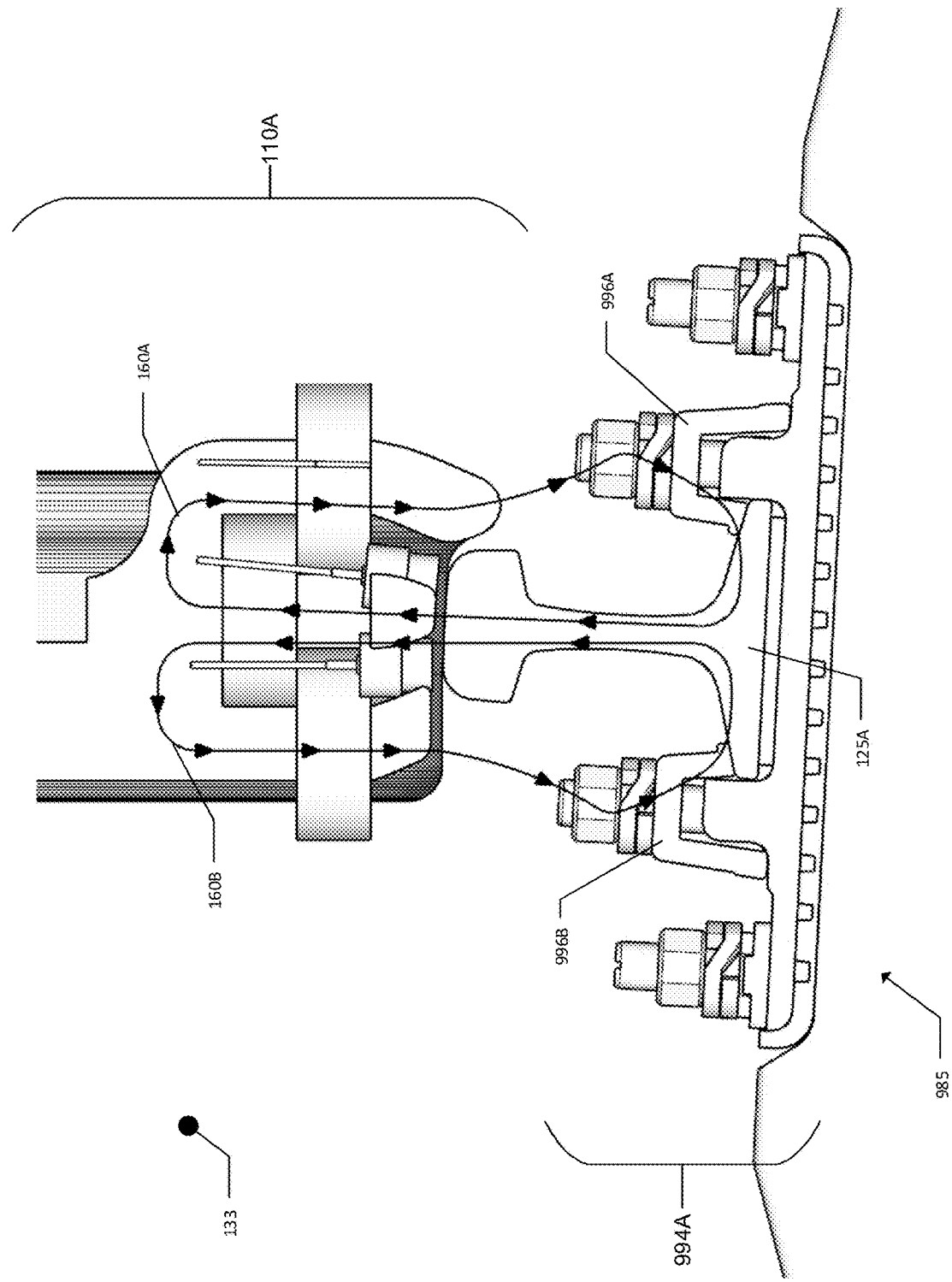
FIG. 3D illustrates a planar view of an electromagnetic engine, as shown from a front perspective.

FIG. 3D illustrates a planar view of the electromagnetic engine 110A, as shown from a front perspective. A clip assembly 994A comprises a first clip 996A and a second clip 996B. The clips 996A, 996B may provide substantial connection to a railway sleeper 985. As discussed herein, the attractive forces 160A, 160B may be measured by the electromagnetic sensors 120A, 120B, 120C. In the instant figure, the attractive forces 160A, 160B may be measured as passing through a substantially ideal clip assembly similar to the clip assembly 994A. Such measurement may be utilized to form a signature of magnetic forces to subsequently be utilized by the electromagnetic engine 110A to detect a defect within the clip assembly 994A (or another nearby component).

Figure 3E:
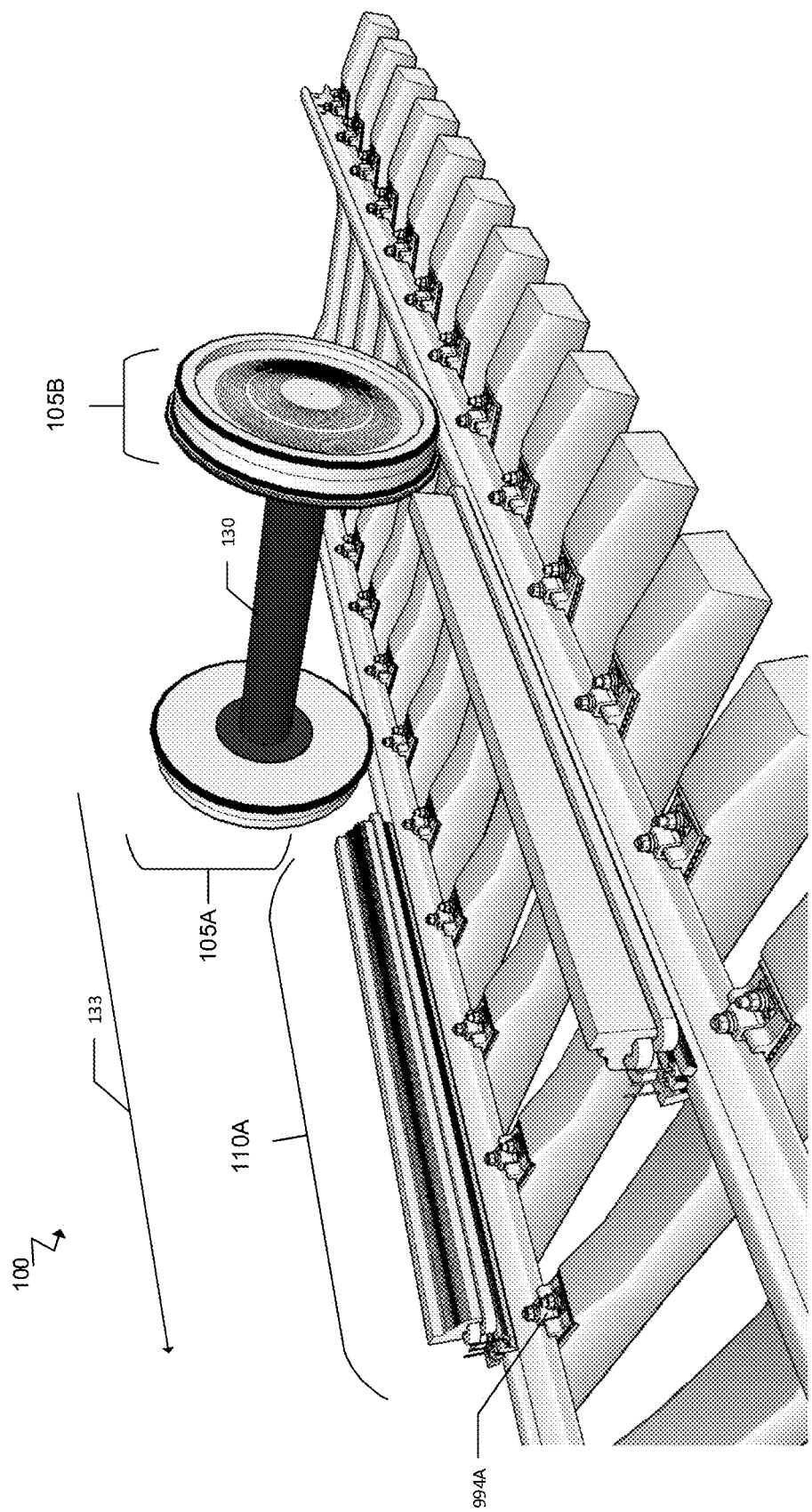
FIG. 3E illustrates a three-quarter perspective of a wheeled bogie assembly, as shown from a front perspective.

FIG. 3E illustrates a three-quarter perspective of the wheeled bogie assembly 100, as shown from a front perspective. The segment of track depicted is similar to a substantially ideal segment from which the electromagnetic engine 110A may generate signatures and perform calibration operations. As discussed, the signature may be later utilized to detect the presence of a defect (including the absence of material and/or components).

In one aspect, the electromagnetic engine 110A may count the number of clip assemblies (e.g., the clip assemblies 994A) over which the wheeled bogie assembly 100 has traveled. The count of clip assemblies may be utilized in conjunction with a real-world-based map of the track in order to determine the real-world location of the bogie assembly 100 along the track. Such location determination may be particularly useful within tunnels where GPS may not be operable to determine location.

Figure 4:
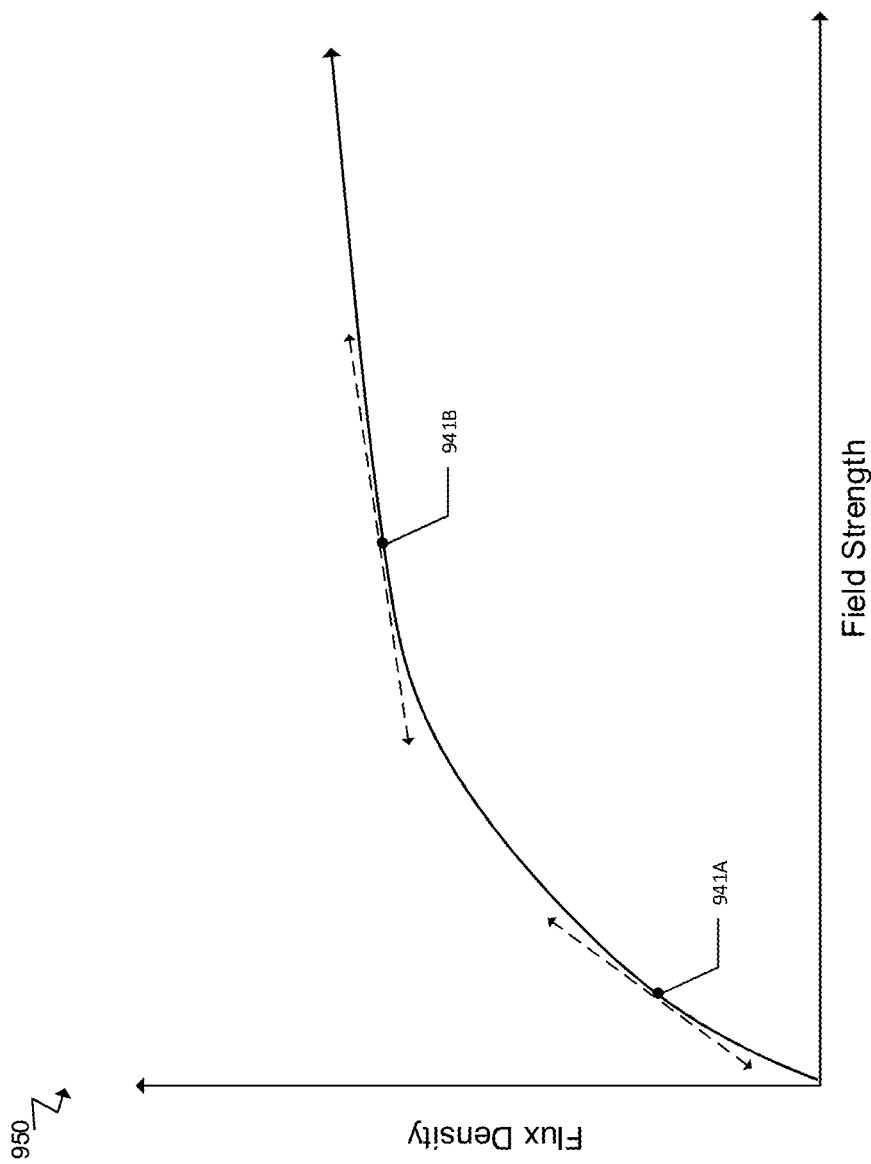
FIG. 4 illustrates a graph of the relationship between flux density and field strength.

FIG. 4 illustrates a graph 950 of the relationship between flux density and field strength. Eddy current inspection of rails may be accomplished by utilizing two functional components viz. an excitation source and a sensor.

Excitation may be achieved by many means. One of skill in the art will appreciate that a magnetic field can be produced by using a coil, a permanent magnet, or combination thereof. Alteration of the magnetic field may be achieved using an applied electrical load, an applied mechanical load, or combination thereof. If the applied load is electrical, then the alteration to the magnetic field typically involves a coil with an oscillating current. Likewise, if the load is mechanical, then the alteration to the magnetic field typically involves moving a static field source at a given velocity. In one aspect, the excitation source may be the electromagnetic coils 115A, 115B, 115C, 115D, 115E, 115F.

In one aspect, the electromagnetic coils 115A, 115B, 115C, 115D, 115E, 115F generate an electromagnetic field at a given frequency. The electromagnetic field may permeate the rail at a depth governed by the laws of electromagnetism. The depth of the permeation of the field into the rail is a function of the frequency of the field, the permeability of the material, and the conductivity of the material. In one aspect, the material is a steel rail. The relationship in Formula 1, below, may be utilized to calculate the depth of permeation.

$$d \propto \frac{1}{\sqrt{\pi f \mu \sigma}}$$

where d is skin depth, f is frequency, µ is permeability, and σ is conductivity.

Formula 1: Skin Depth of the Eddy Current in a Conductive Medium

The depth calculated by the expression above may be referred to as the "skin depth" viz. the depth at which the current density has fallen to 1/e (~37%) of the current density at or near the surface of the material. The electrical current distribution described by Formula 1 has an exponential form, hence the relationship of the current density of the surface material to the current density at the fall-off value (of 1/e).

One of skill in the art will appreciate that the material parameters dominate the determination of the skin depth as provided by Formula 1. In general, the material properties are more difficult to modify in practice than the frequency of the electromagnetic field. Therefore, deeper excitation may be achieved by using a lower frequency.

However, low-frequency excitation has challenges with respect to the amplitude of the signal. While frequency relates directly to skin depth, frequency may also have an influence on the density of the induced eddy-current in the material (e.g., steel commonly found in rails). Therefore, low-frequency excitation may also generate a weaker signal. Formula 2 below demonstrates the relationship between frequency and signal strength.

$$P_{ec} \propto B^2 f^2$$

where $P_{ec}$ is power, B is flux density, and f is frequency.

Formula 2: Power Dissipated in a Conductive Medium

As shown in Formula 2, an excitation signal of one-quarter the frequency would therefore have twice the skin depth but also one sixteenth the power. To maintain the same skin depth with a full signal power (viz. of one) would require a flux density that is four times higher.

The electromagnetic engines 110A, 110B may be utilized to achieve magnetic saturation in the rail for the purposes of detecting defects within the rail. The defects detected may be patent or even latent. One of skill in the art understands that detection of patent defects is generally the result of visual inspection by human technicians. For example, a human may visually observe a 10 mm crack in the rail steel by measuring with a tool. One of skill in the art also understands that latent defects are more difficult to detect. Often, latent defects require specialized testing equipment (e.g., ultrasonic-based inspection units). Such specialized testing equipment is likely human-operated as well. Even then, ultrasound has limitations in certain operating conditions (e.g., during rain).

By utilizing eddy current-based detection, the electromagnetic engines 110A, 110B may detect defects resulting from an interruption in the electrical flow. Defects may be cracks in the metal that are detectable by eddy currents because the crack causes an interruption to the electrical flow. Such an interruption of electrical flow may be considered a form of electrical insulation. Defects may also be the result of changes in the metallurgical properties of the metal forming the rail. Work hardening may create additional hysteresis cycles that fatigue the metal to a limit where the coercivity of the metal is altered along with the other magnetic properties of the metal. Changes in the metallurgical properties may be detected by changes in the eddy current flow as the flow deviates from a nominal flow expected for a given section of rail. For instance, the nominal flow may be determined during a calibration mode. One of skill in the art will appreciate that the aforementioned detection processes are contactless since the electromagnetic engines 110A, 110B have an air gap above the rail.

The graph 950 generally depicts the relationship of field strength (x-axis) to flux density (y-axis) in the material. One of skill in the art will appreciate that as field strength increases, flux density likewise increases. Depending on the magnitude of the flux density being considered, the permeability may decrease relatively dramatically. At the point 941A, the instantaneous rate of change is denoted by the touching dotted line. At the point 941B, the instantaneous rate of change is denoted by the touching dotted line. One of skill in the art will appreciate that the slope of the dotted line at the point 941A is higher than the slope of the dotted line at the point 941B.

For illustrative purposes, the slope of the dotted line at the point 941A may be considered to be a value of "100." Further, the slope of the dotted line at the point 941B may be considered to be a value of "25." One of skill in the art will appreciate that the improvement in the sensing depth will be a factor of two. Moreover, the variability in the permeability at the upper end of the curve will be smaller. Therefore, when the condition of the material is near to the upper end of the curve, variations in the detected signal will be less dependent on local grain structure, thus resulting in a better signal-to-noise ratio for mechanical defect detection.

Figure 5A:
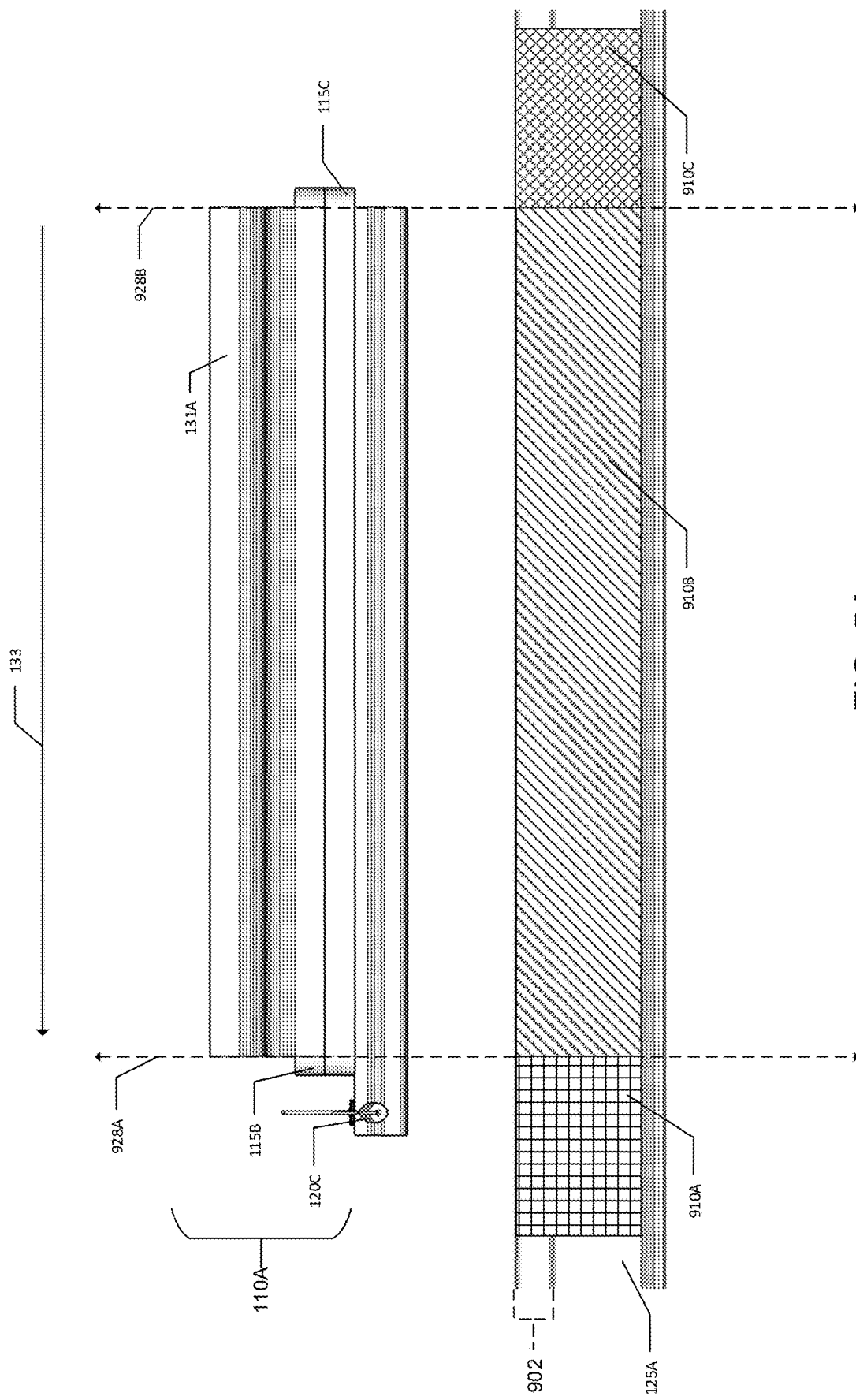
FIG. 5A illustrates a planar view of an electromagnetic engine, as shown from a side perspective.

FIG. 5A illustrates a planar view of the electromagnetic engine 110A, as shown from a side perspective. Further, the shown perspective is from the inside area of the track i.e., the area bounded by the two rails defining the track. For the purpose of clarity, the wheels have been removed from the instant figure. Further, the electromagnetic engine 110A has been raised from the rail to illustrate the various flux densities within the rail 125A.

The electromagnetic engine 110A may travel along the ray 133 as previously disclosed herein. Further, the electromagnetic engine 110A is disposed above the rail 125A. In one aspect, the electromagnetic engine 110A is distanced from a rail head 902 by an air gap (not readily visible in the instant figure). One of skill in the art will appreciate that when in operation, the electromagnetic engine 110A is not in physical contact with the rail 125A. One benefit of contactless scanning or inspection of the rail 125A is that further physical wear on the rail 125A is avoided.

The electromagnetic engine 110A may utilize the electromagnetic coils 115A, 115B, 115C to generate a field. An area 910A represents a section, of the rail 125A, that is unbiased by the field generated by the electromagnetic coils 115A, 115B, 115C. An axis 928A defines the boundary between the area 910A and an area 910B. The axis 928A is substantially aligned with the face, of the steel core 131A, which is further along the direction of travel defined by the ray 133. In commercial deployment, flux may extend before and after the axis 928A but is so illustrated for purposes of clarity. One of skill in the art will appreciate that the area 910A is unbiased given that the electromagnetic engine 110A has not reached the area 910A since the electromagnetic engine 110A is traveling along the ray 133 toward the area 910A.

The area 910B represents the section of the rail 125A that is more biased than the area 910A since the electromagnetic engine 125A is substantially directly positioned above the area 910B, thus increasing flux density. Therefore, the area 910B has a higher flux density than the area 910A.

An axis 928B is substantially aligned with the face, of the steel core 131A, on the rear surface as defined with respect to the direction of travel (defined by the ray 133). The axis 928B defines a boundary between the area 910B and an area 910C. The area 910C represents a section of the rail 125A that is biased by the electromagnetic engine 110A. However, the flux density within the area 910C is relatively lower than the flux density within the area 910B. The difference in flux density between the areas 910B, 910C is due to the electromagnetic engine 110A moving away from the area 910C as the electromagnetic engine 110A proceeds along the direction of travel denoted by the ray 133. One of skill in the art will appreciate that the field generated by the electromagnetic coils 115A, 115B, 115C may extend further than the areas 910A, 910B, 910C, as governed by the basic laws of electromagnetism. Therefore, the axes 928A, 928B are utilized for illustrative purposes.

Figure 5B:
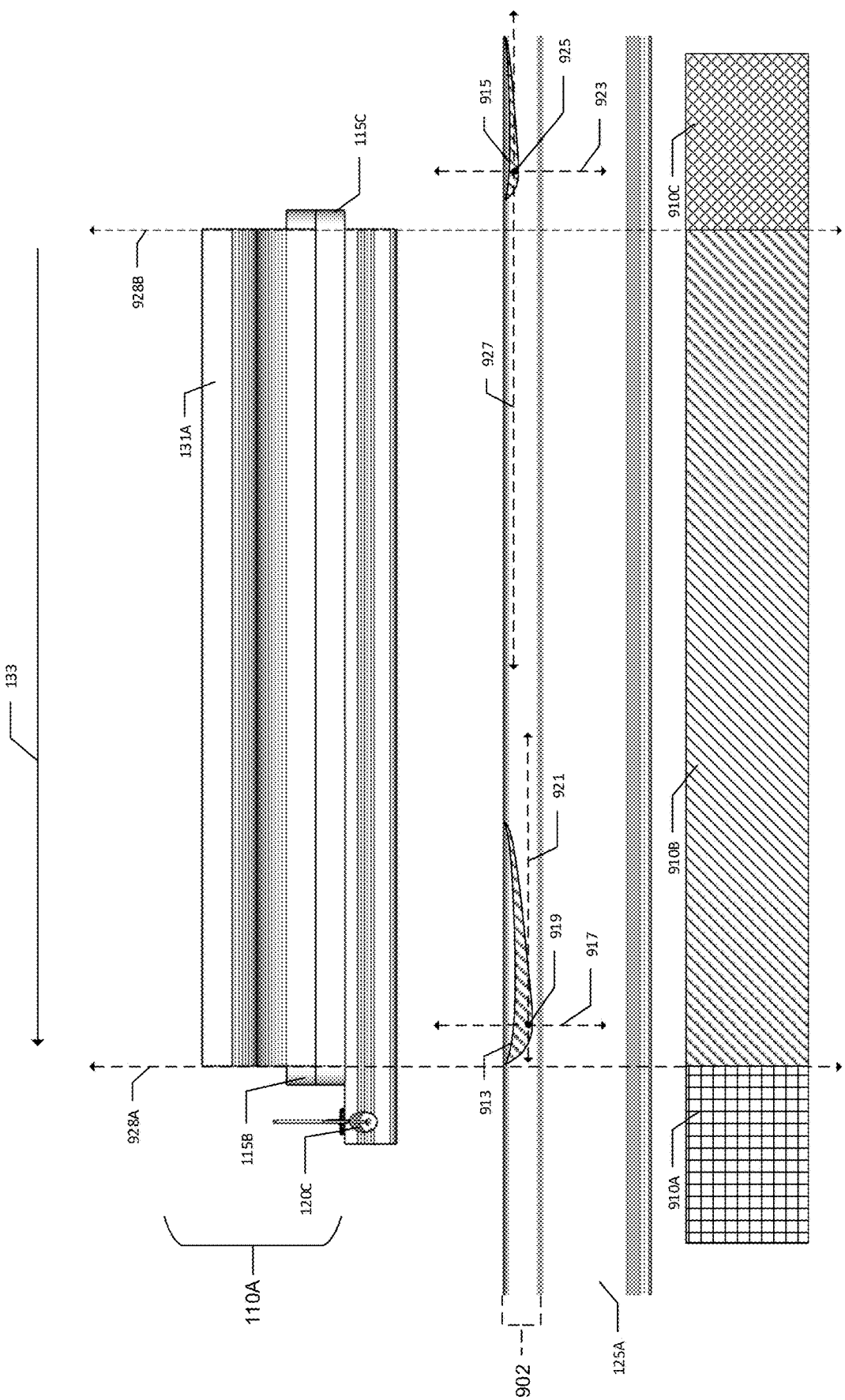
FIG. 5B illustrates a planar view of an electromagnetic engine, as shown from a side perspective.

FIG. 5B illustrates a planar view of the electromagnetic engine 110A, as shown from a side perspective. The areas 910A, 910B, 910C are depicted below the rail 125A for illustrative purposes only. One of skill in the art will appreciate that the areas 910A, 910B, 910C are presented for logical understanding of the solution disclosed herein. For the purposes of clarity, the electromagnetic engine 110A has been raised above the rail 125A.

As the electromagnetic engine 110A moves along the direction of travel 133, additional fields may be generated. The electromagnetic engine 110A may apply an electromagnetic field to the rail 125A as the electromagnetic engine 110A traverses the rail 125A; such excitation operates similarly to a permanent magnet moving via a mechanical force. As non-biased segments of the rail 125A traverse below the electromagnetic engine 110A, the static field generated by the electromagnetic engine 110A may create an eddy current in an area experiencing a higher rate of change in flux density.

The rate of change in flux density between the area 910A and the area 910B may create an eddy current in an area 913. The area 913 is distributed in width along an axis 921, which is parallel to the rail 125A. Likewise, the area 913 is distributed in height along an axis 917. The axes 917, 921 substantially intersect at a center 919 within the area 913.

One of skill in the art will appreciate that the area 913 may have a slightly different shape in commercial deployment. The depth marked by the center 919 may vary and create an elongated shape toward the right side of the axis 921. The electromagnetic sensors 120A, 120B, 120C may be configured to detect changes in the measured amplitude of the eddy current in order to detect and identify defects within the rail 125A because a defect may interrupt the electrical flow within the eddy current.

The rate of change in flux density between the area 910B and the area 910C may create an eddy current in an area 915. The area 915 is distributed in width along an axis 927, which is parallel to the rail 125A. Likewise, the area 915 is distributed in height along an axis 923. The axes 923, 927 substantially intersect at a center 925 within the area 915. The electromagnetic sensors 120A, 120B, 120C may be configured to detect changes in the measured amplitude of the eddy current in order to detect and identify defects within the rail 125A.

The eddy current within the area 913 is depicted as being substantially larger than the second area 915. One of skill in the art will appreciate that the flux density of the area 910A is lower than the flux density of the area 910B. As the electromagnetic engine 110A travels along the rail 125A and in the same direction as the ray 133, the electromagnetic engine 110A creates an eddy current area 913 with higher skin depth due to the higher difference between the flux densities of the area 910A and the area 910B. Likewise, the eddy current area 915 has a lower skin depth; since the flux densities of the area 910B and the area 910C are closer in value, the resulting eddy current area 915 is correspondingly smaller.

One of skill in the art will appreciate that the center 919 is positioned lower than the center 925. Additionally, the axis 921 and the axis 927 are offset to illustrate the difference in depths of the centers 919, 925. Since the depth of the centers 919, 925 are at different values, the electromagnetic engine 110A may form observations at two different skin depths with a single pass over a section of rail. One of skill in the art will appreciate that a multitude of electromagnetic engines may be fitted to a bogie (or several bogies) such that different skin depths may be observed by each of the various electromagnetic engines passing over a particular defect.

The electromagnetic engine 110A may compare the nominal amplitude of an eddy current passing through a defect-free section of the rail 125A against the measured amplitude of the eddy current passing through the rail 125A. Such defect-free rail sections may be utilized when calibrating the electromagnetic engines 110A, 110B. The difference between the nominal and the observed amplitudes provides an indication of the presence of a defect as well as the position and size of the defect.

Figure 5C:
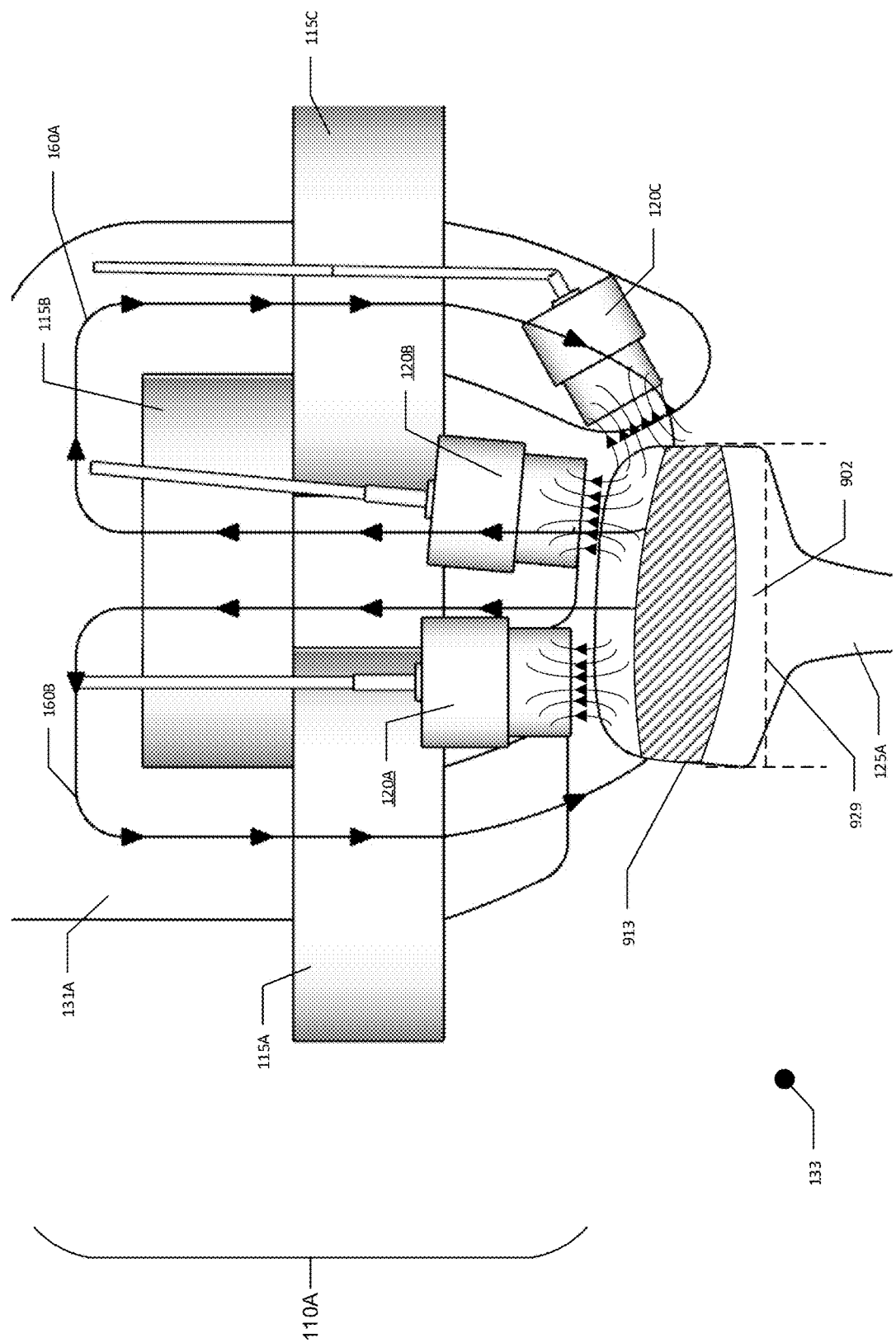
FIG. 5C illustrates a planar view of an electromagnetic engine, as shown from a front perspective.

FIG. 5C illustrates a planar view of the electromagnetic engine 110A, as shown from a front perspective. The rail 125A is depicted with the area 913 shown from the front perspective. A distance 929 denotes that the area 913 may cross the entire width of the rail head 902. One of skill in the art will appreciate that the area 913 substantially follows the profile of the rail 125A.

Figure 5D:
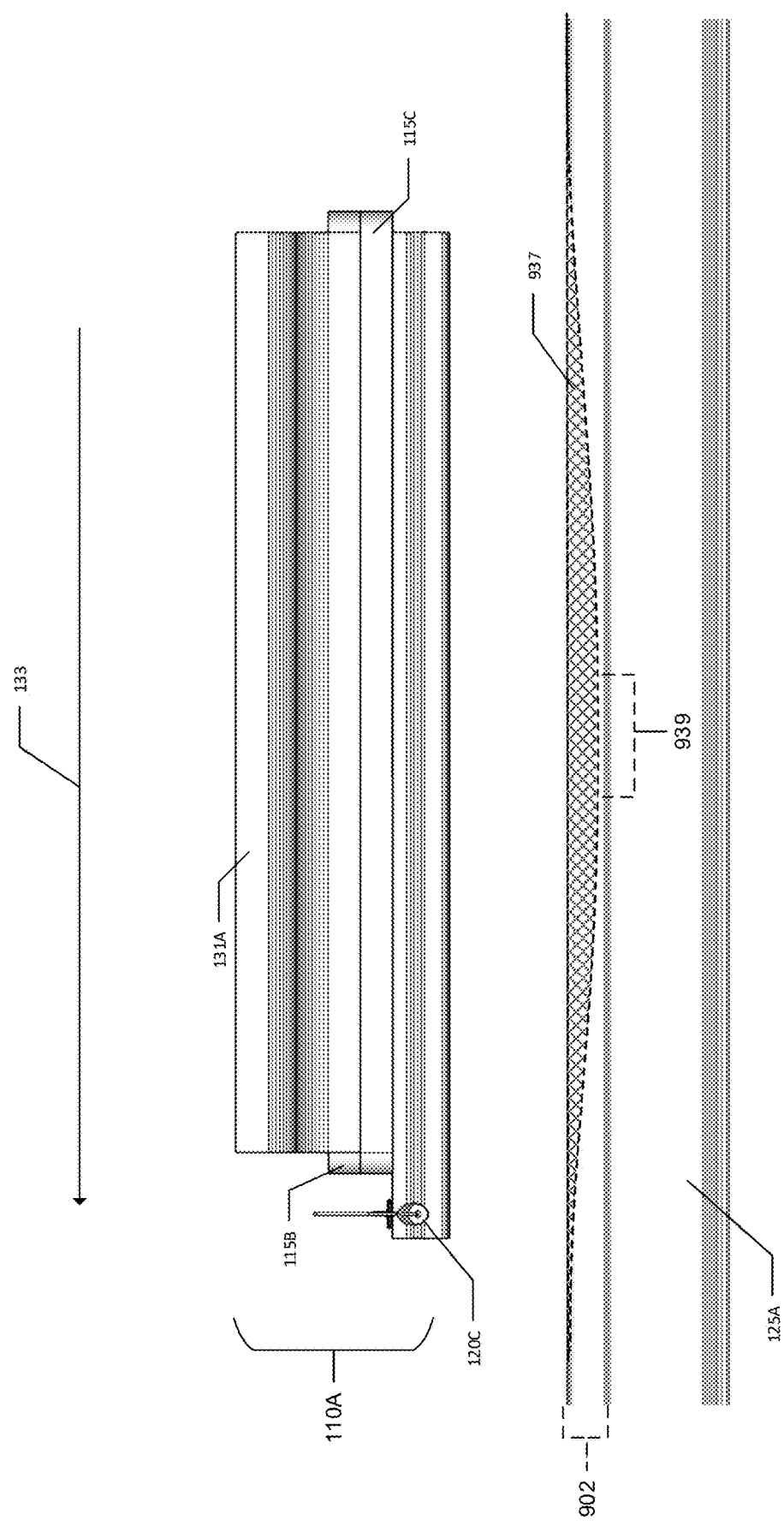
FIG. 5D illustrates a planar view of an electromagnetic engine, as shown from a side perspective.

FIG. 5D illustrates a planar view of the electromagnetic engine 110A, as shown from a side perspective. An area 937 of the rail head 902 may be missing from the rail 125A. The area 937 represents a profile defect based on a distance between the electromagnetic engine 110A and the rail 125A. A distance 939 substantially denotes the lowest trough of the area 937.

A defect may be observed by either a change in the amplitude of the eddy current or a variation within the magnetizing field itself. An eddy current is produced by the motion of the electromagnetic engine 110A along sections of rail with different flux densities. Typical defects (e.g., cracks) may be detected by an interruption in the amplitude of the eddy current signal. The profile defect within area 937 may be difficult to detect as a change in amplitude in the eddy current. However, a change in the amplitude of the magnetizing field itself may be detected and interpreted because the average flux density may be reduced in phase with the defect, rather than phase shifted by the inductive properties of the rail 125A and surrounding elements.

In one aspect, the phase of the defect signal with respect to the magnetizing field may be continuously measured such that the electromagnetic engine 110A may record the position of the defect within the area 937 where rail is missing. A defect of length greater than the bogie may be difficult to detect by a change in phase of the magnetizing field since the distance between the electromagnetic engine 110A and the rail 125A may appear to be near the nominal distance as the wheelset is riding lower. Stated differently, the wheelset may simply be riding in a long valley of missing rail due to a long, and even subtle, profile defect. However, an accelerometer may be utilized to detect any disturbance in stability along with the change of phase and/or an interruption in the eddy current signal. Therefore, defects may be detected by measuring interruption in the eddy current, measuring variations in the magnetizing flux, measuring relative movement via accelerometer, or combination thereof.

FIG. 5E illustrates a planar view of the electromagnetic engine 110A, as shown from a front perspective. The instant figure shows the area 937 as a missing section of the rail head 902. One of skill in the art will appreciate the distance 939 is shown as a point and is substantially positioned near the bottom of the area 937.

Figure 6:
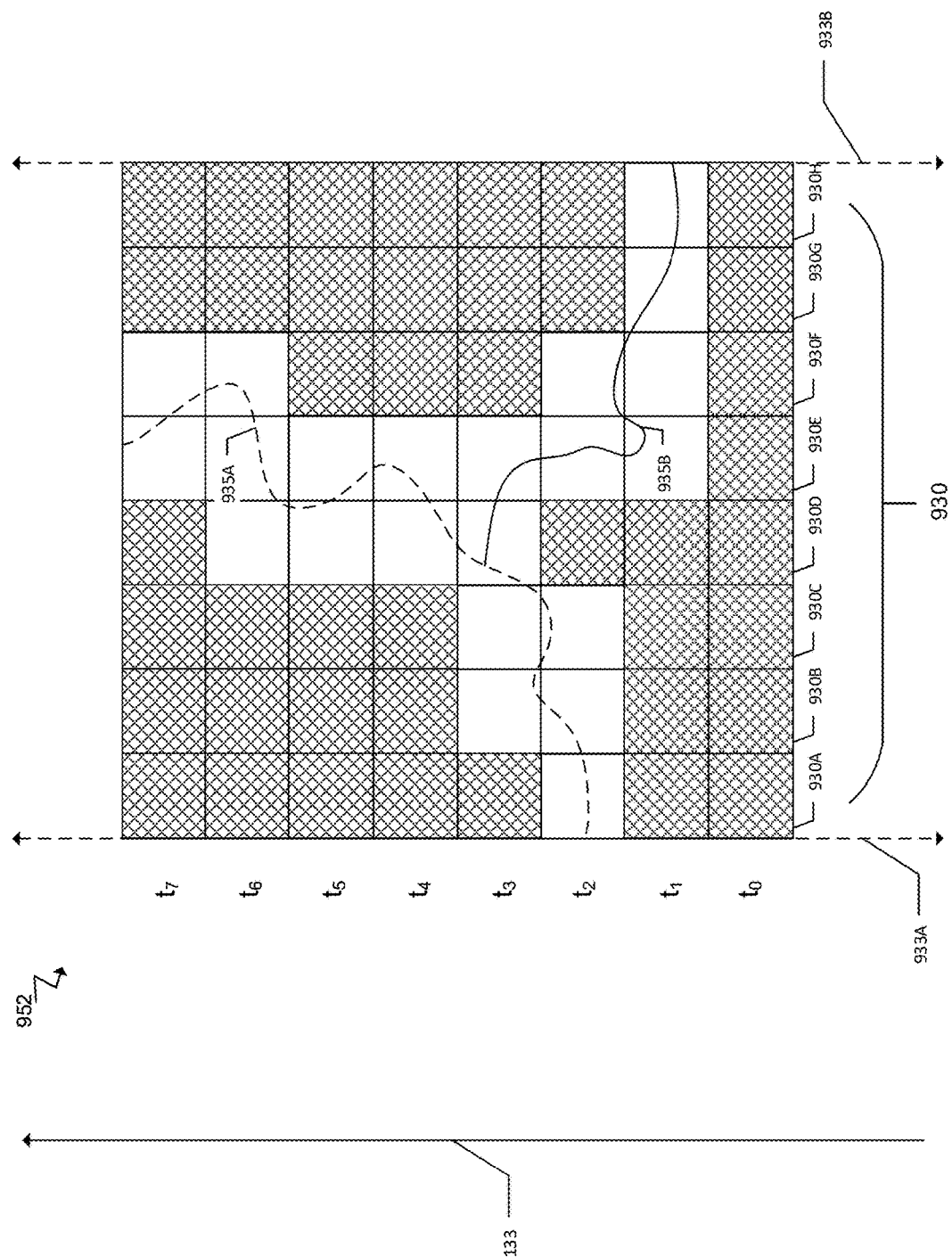
FIG. 6 illustrates a logical view of a plurality of sensors identifying a plurality of defects within a segment of rail, as shown from a top perspective with respect to the rail.

FIG. 6 illustrates a logical view 952 of a plurality of sensors 930 identifying a plurality of defects within a segment of rail, as shown from a top perspective with respect to the rail 125A (not visible in the instant logical view). The plurality of sensors 930 may be comprised of a sensor 930A, a sensor 930B, a sensor 930C, a sensor 930D, a sensor 930E, a sensor 930F, a sensor 930G, and a sensor 930H. An axis 933A denotes the left boundary of the rail 125A (not visible in the instant logical view). An axis 933B denotes the right boundary of the rail 125A (not visible in the instant logical view). In one aspect, the plurality of sensors 930 may correspond to the electromagnetic sensors 120A, 120B, 120C, 120D, 120E, 120F. One of skill in the art will appreciate that the plurality of sensors 930 is illustrative and not limiting. Further, the number of sensors within the plurality of sensors 930 may vary based on considerations related to commercial implementation.

As described herein, a defect may be observed by either a change in the amplitude of the eddy current or a variation in the amplitude of the magnetizing flux itself. Typical defects (e.g., cracks) may be detected by an interruption in the amplitude of the eddy current being produced by the motion of the electromagnetic engine 110A along sections of rail with different flux densities. A profile defect of missing material, as described in FIG. 2B above, may be detected by a variation in the amplitude of the magnetizing flux itself, as produced by the electromagnetic engine 110A. A defect 935A and a defect 935B may be discovered by the former method i.e., a change in the amplitude of the eddy current because the defects 935A, 935B may be cracks in the rail 125A.

The electromagnetic engine 110A may travel along the direction defined by the ray 133. As the electromagnetic engine 110A travels, the various time reference points are reached viz. $t_0$, $t_1$, $t_2$, $t_3$, $t_4$, $t_5$, $t_6$, and $t_7$. As shown at $t_2$, the sensor 930C may detect the defect 935A. Throughout the view 952, the white boxes represent a defect being detected, and the hatch-marked boxes indicate no defect was detected. The second defect 935B may be detected by the sensors 930D, 930E, 930F, 930G, 930H. In one aspect, the plurality of sensors 930 operate to determine the intersection of the defects 935A, 935B at $t_3$ and as measured by the sensor 930D.

For illustrative purposes, the defect 935A may characterized as larger than the defect 935B. The defect 935A may be determined to be larger as the amplitude of the eddy current is more affected than the amplitude of the eddy current reaching the defect 935B.

Once a defect is detected at a given frequency, the electromagnetic engine 110A may utilize a second frequency to adjust the skin depth in order to gather more observations for the identified defect. Since a defect is a three-dimensional object, the latitudinal arrangement of the plurality of sensors 930 forms observations oriented in parallel to the plurality of sensors 930 i.e., the x-axis of a three-dimensional image. The longitudinal motion of the electromagnetic engine 110A forms observations along the axes 933A, 933B i.e., the y axis of a three-dimensional image. The adjustment to the frequency may alter the skin depth to determine the depth at which the defect may be observed i.e., the z-axis of a three-dimensional image. The combination of x-axis, y-axis, and z-axis observations forms a full picture of a particular defect such that the defect may be addressed by conventional maintenance and repair methods. Metadata may augment the positional observations with additional information useful in diagnosing the defect, monitoring the defect, scheduling a follow-up observation, etc.

Figure 7A:
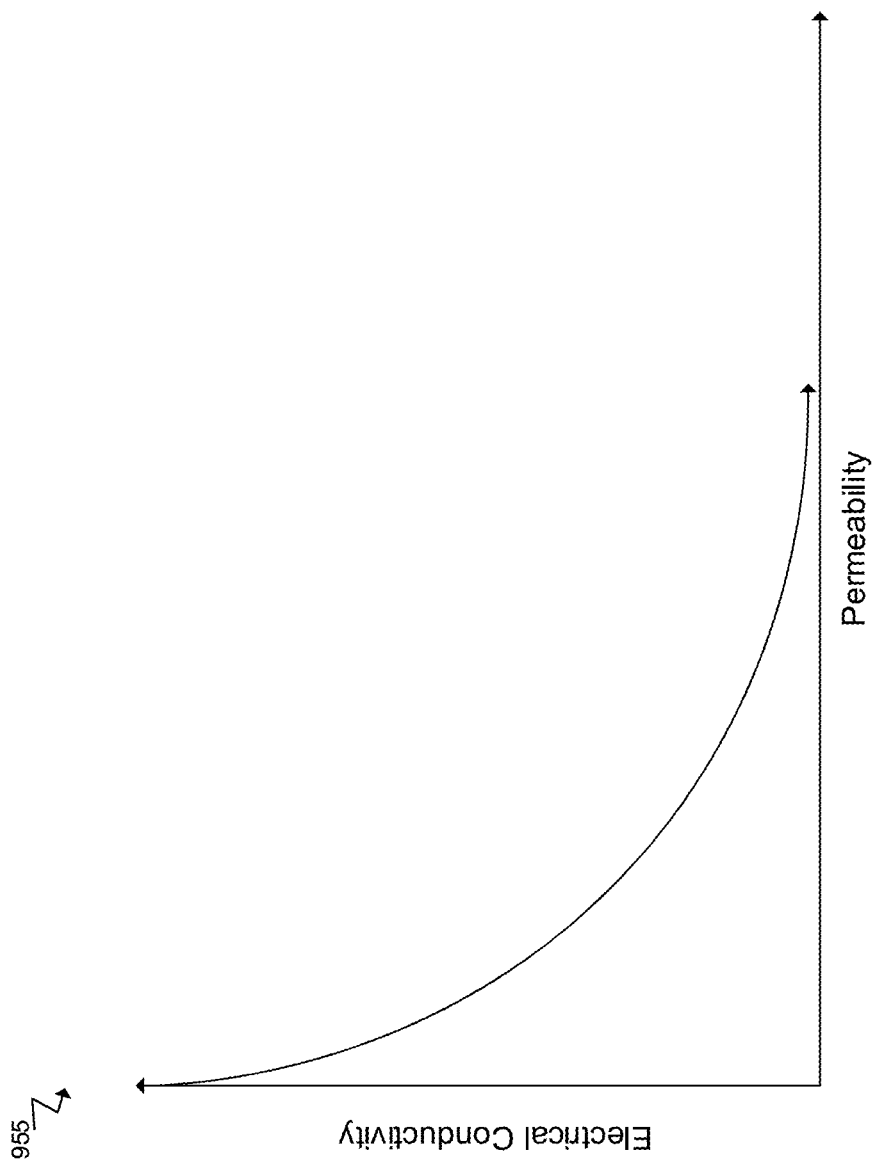
FIG. 7A illustrates a graph of the relationship between electrical conductivity and permeability.

FIG. 7A illustrates a graph 955 of the relationship between electrical conductivity and permeability. Even with the assistance of the electromagnetic engines 110A, 110B, the bogie assembly 100 may still cause RCF in the rails 125A, 125B. Further, RCF may be highly localized in the rail head and/or rail crown. In one aspect, the strength of the steel of the rails 125A, 125B may be increased by utilizing a steel alloying process. For example, steel alloys may be formed using silicon, magnesium, etc. One of skill in the art will appreciate that many other elements may be combined with steel to form an alloy which provided increased metal strength.

However, steel alloys may have reduced electrical conductivity depending on the alloying element. As shown in the graph 955, some alloying methods which reduce electrical conductivity may also result in increased permeability. As disclosed in Formula 1 above, the permeability of the rails 125A, 125B affects the resulting electromagnetic fields generated by the coils 115A, 115B, 115C, 115D, 115E, 115F viz. the skin depth. As such, the signals received by the sensors 120A, 120B, 120C, 120D, 120E, 120F are likewise affected by the permeability of the steel of the rails 125A, 125B. Lowered permeability increases skin depth given the inverse relationship of skin depth and permeability shown in Formula 1 above. Therefore, steel alloying may increase strength, decrease electrical conductivity, increase permeability, and decrease skin depth.

One of skill in the art will appreciate that increasing the strength of the steel of the rails 125A, 125B reduces RCF which results in lowered maintenance costs and increased safety. However, the increased permeability may create undesirable effects related to decreased skin depth, which is utilized as part of the non-destructive examination ("NDE") of the rails 125A, 125B by the electromagnetic engines 110A, 110B. Therefore, other techniques may be employed to decrease permeability and correspondingly increase skin depth; such techniques are disclosed herein.

Figure 7B:
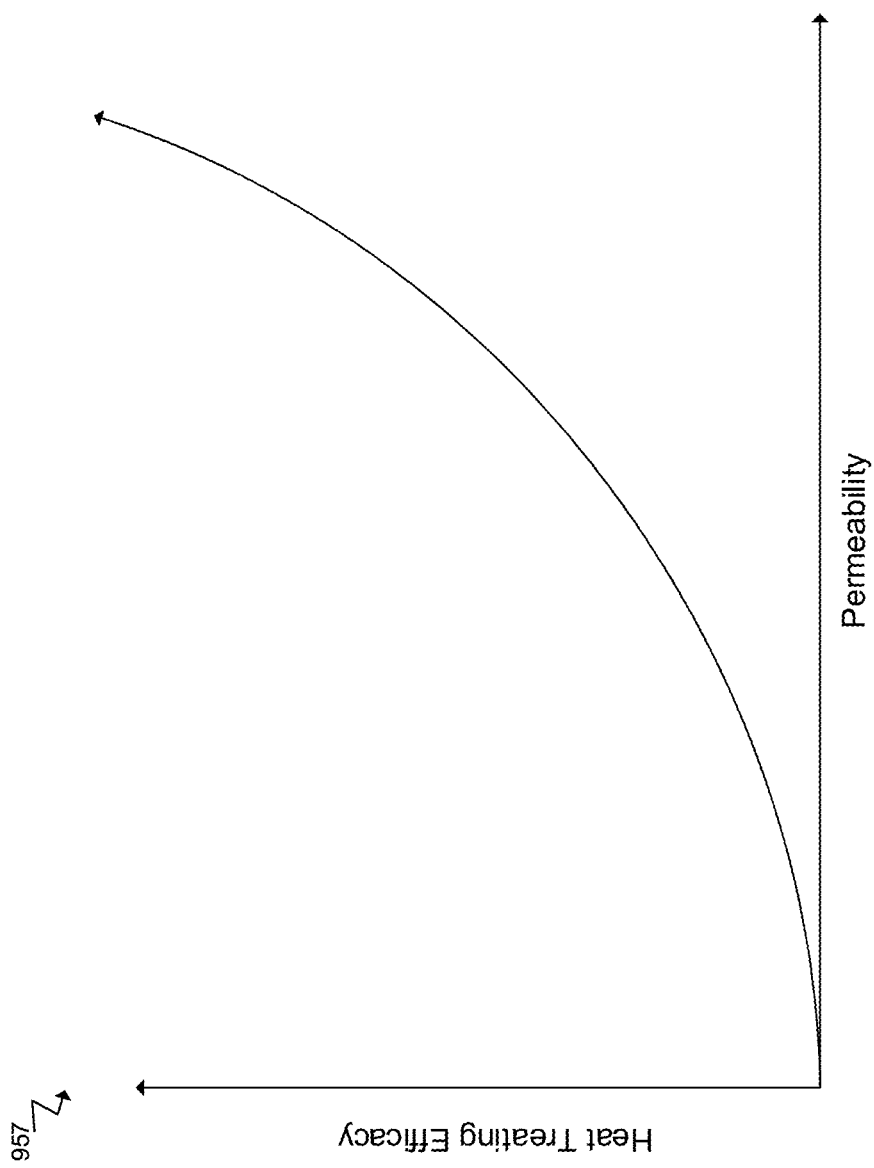
FIG. 7B illustrates a graph of the relationship between heat treating efficacy and permeability.

FIG. 7B illustrates a graph 957 of the relationship between heat treating efficacy and permeability. Heat treating steel may soften and relieve stress within the material which results in increased strength. Examples of heat-treating techniques include annealing, quenching, tempering, etc. However, heat treating may also result in an increased permeability which may not be desirable for the skin depth utilized by the electromagnetic engines 110A, 110B for NDE. As stated, decreased skin depth reduces the ability of the electromagnetic engines 110A, 110B to perform NDE to detect latent defects within the rails 125A, 125B.

One of skill in the art will appreciate that latent defects may be present within the rails 125A, 125B (e.g., as shown by the defects 981A, 981B above). The defects 981A, 981B may require a signal, with an adequate skin depth, in order for the defects 981A, 981B to be detected by the electromagnetic engines 110A, 110B. Therefore, other techniques may be employed to decrease permeability and correspondingly increase skin depth; such techniques are disclosed herein.

Figure 7C:
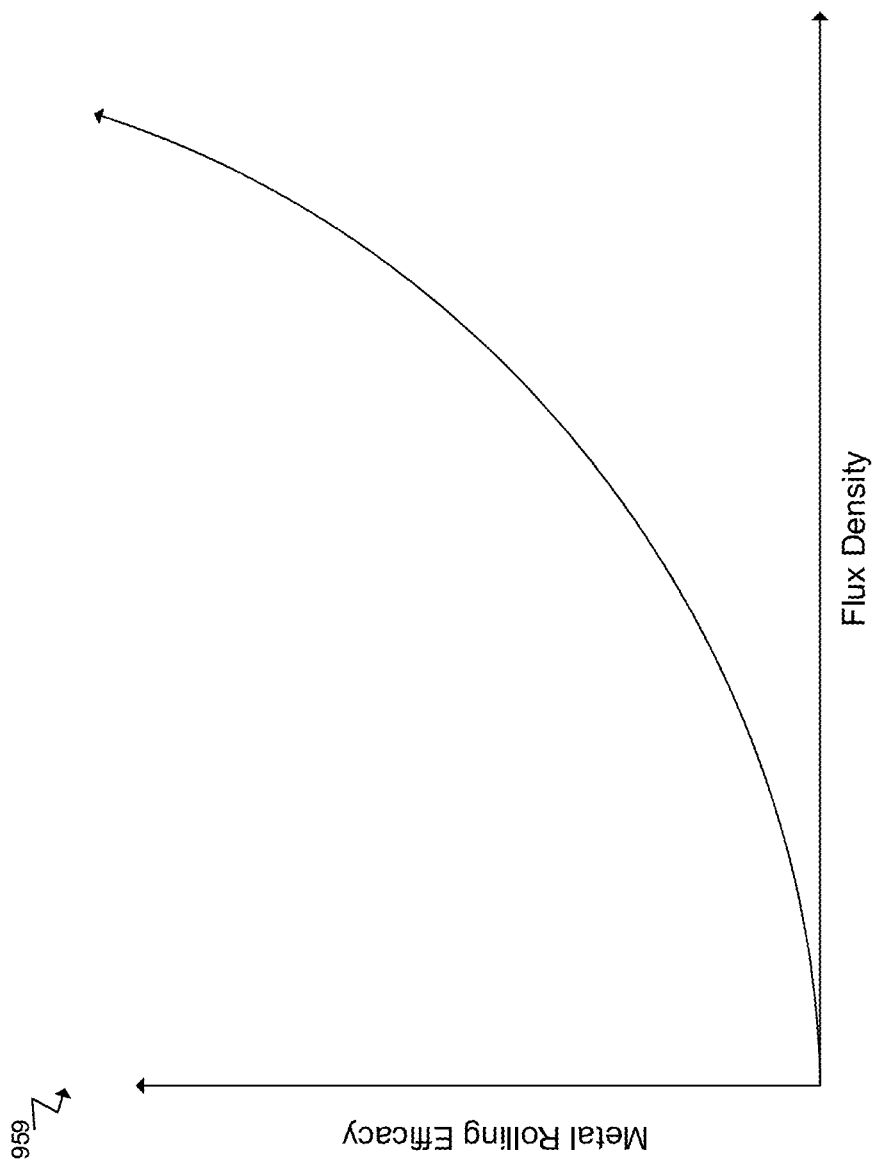
FIG. 7C illustrates a graph of the relationship between metal rolling efficacy and flux density.

FIG. 7C illustrates a graph 959 of the relationship between metal rolling efficacy and flux density. Generally, metal rolling increases metal strength. Further, metal rolling orients the metal grains and may increase the flux density, as shown in the graph 959. The flux density within the steel of the rails 125A, 125B affects the skin depth of the eddy currents generated by the coils 115A, 115B, 115C, 115D, 115E, 115E and measured by the sensors 120A, 120B, 120C, 120D, 120E, 120F, as specifically discussed above.

One of skill in the art will appreciate the relationship among flux density, field strength, permeability, and metal strength may need to be balanced in order to receive meaningful results from the NDE performed by the electromagnetic engines 110A, 110B. A solution proposed herein is to selectively apply treatment to the rails 125A, 125B such that the advantages of heat treatment, metal alloying, and mechanical treatment processes (e.g., extrusion, rolling, cold working, forming, etc.) may be realized in critical areas of the rails 125A, 125B. Further, the disclosed solution achieves increased metal strength without the undesirable effects caused by increased permeability which, in turn, reduces the skin depth of signals used for NDE.

Figure 8A:
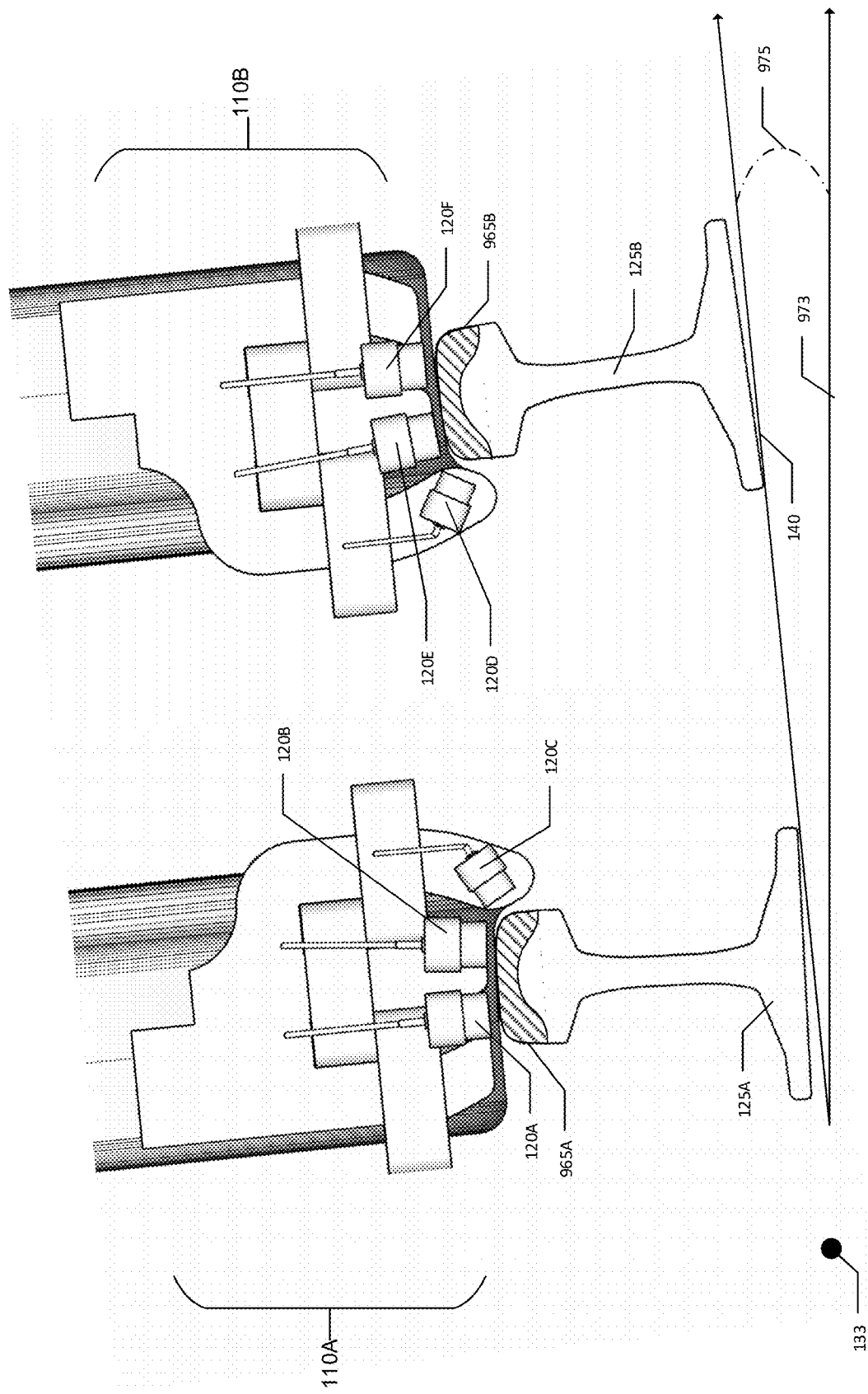
FIG. 8A illustrates a planar view of a plurality of electromagnetic engines, as shown from a front perspective.

FIG. 8A illustrates a planar view of a plurality of electromagnetic engines, as shown from a front perspective. The rail 125A has a treated area 965A. The rail 125B has a corresponding treated area 965B which is substantially similar to the area 965A. In one aspect, the treated area 965B is a mirrored layout of the treated area 965A. The treated areas 965A, 965B are the result of steel alloying, heat treatment, and/or metal rolling. The steel alloy may be formed by utilizing silicon, magnesium, etc., as described in FIG. 7A above. The heat treatment may be performed as described in the FIG. 7B above. Rolling may be performed as described in FIG. 7C above.

The treated areas 965A, 965B shown in the instant figure are generally where the heat treatment may be deployed; however, one of skill in the art will appreciate that the margins of the treated areas 965A, 965B may not be as discrete as shown in the instant figure. In general, the treated areas 965A, 965B have a higher metal strength than the remaining area of the rails 125A, 125B.

As discussed in FIG. 7A through FIG. 7C above, the physical properties of the steel within the rails 125A, 125B may affect the skin depth of the signal measured by the electromagnetic engines 110A, 110B. However, the treated areas 965A, 965B provide a balance between decreased skin depth and increased metal strength. If the entirety of the rails 125A, 125B were treated, then the permeability may be too high to provide an adequate skin depth for the NDE process. One of skill in the art will recall that RCF primarily affects the treated areas 965A, 965B and results in undesirable defects (e.g., head checking). The treated areas 965A, 965B provide protection on both the corners of the rail head as well as the crown of the rail head while still providing a permeability level operable to enable an adequate skin depth for NDE by the electromagnetic engines 110A, 110B.

Figure 8B:
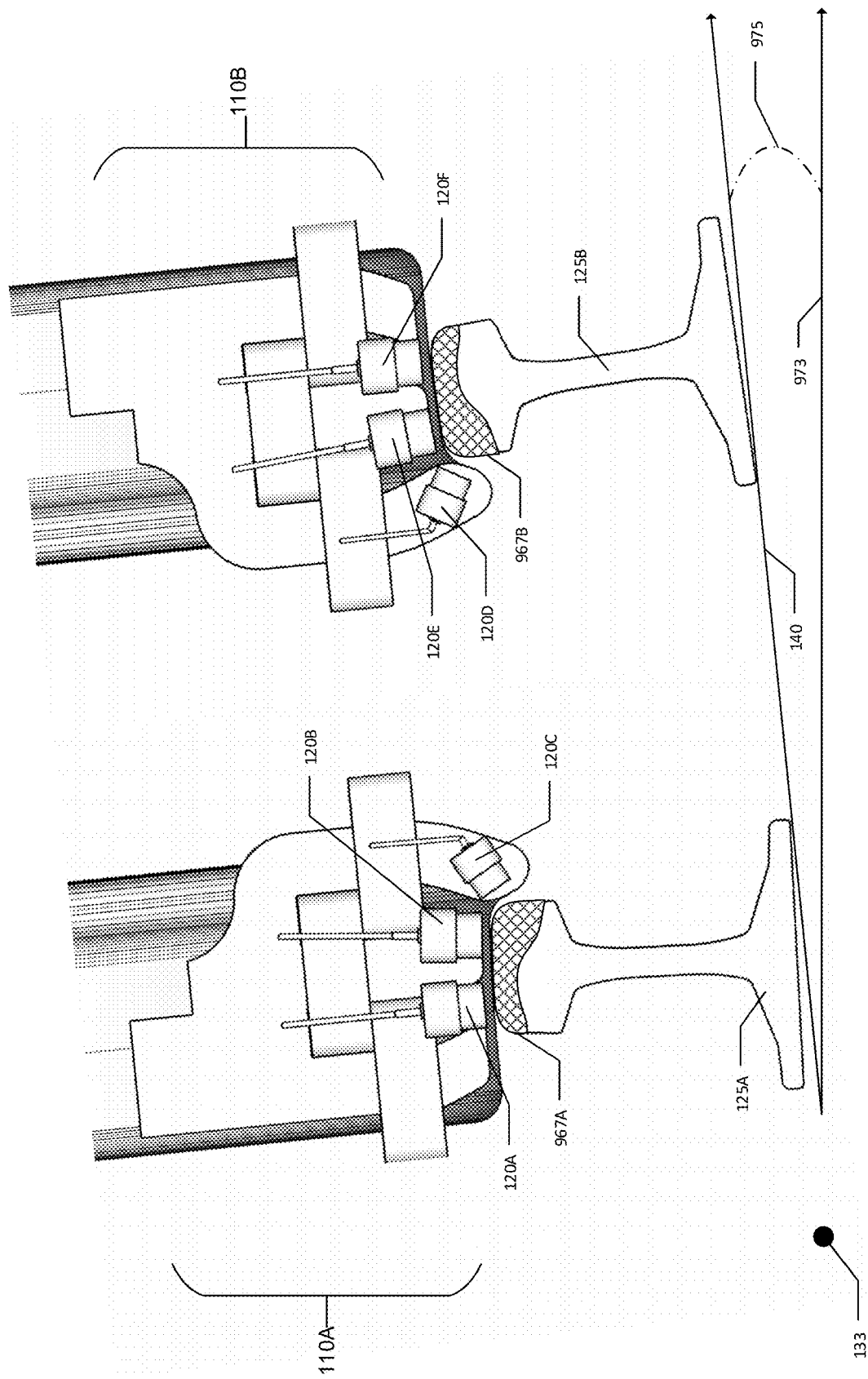
FIG. 8B illustrates a planar view of a plurality of electromagnetic engines, as shown from a front perspective.

FIG. 8B illustrates a planar view of a plurality of electromagnetic engines, as shown from a front perspective. The rail 125A may have a treated area 967A. Likewise, the rail 125B may have a treated area 967B. As discussed herein, the treated areas 967A, 967B may be deployed to increase the strength of desired regions of the rail profile.

The exact position of the treated areas 967A, 967B, as stated, may be slightly different in a deployed configuration. In the instant figure, the treated areas 967A, 967B are designed to prevent RCF between the flange of the wheel assemblies 105A, 105B and the inner rail head corners i.e., the rail head corners closer to the bogie assembly 100.

Figure 9A:
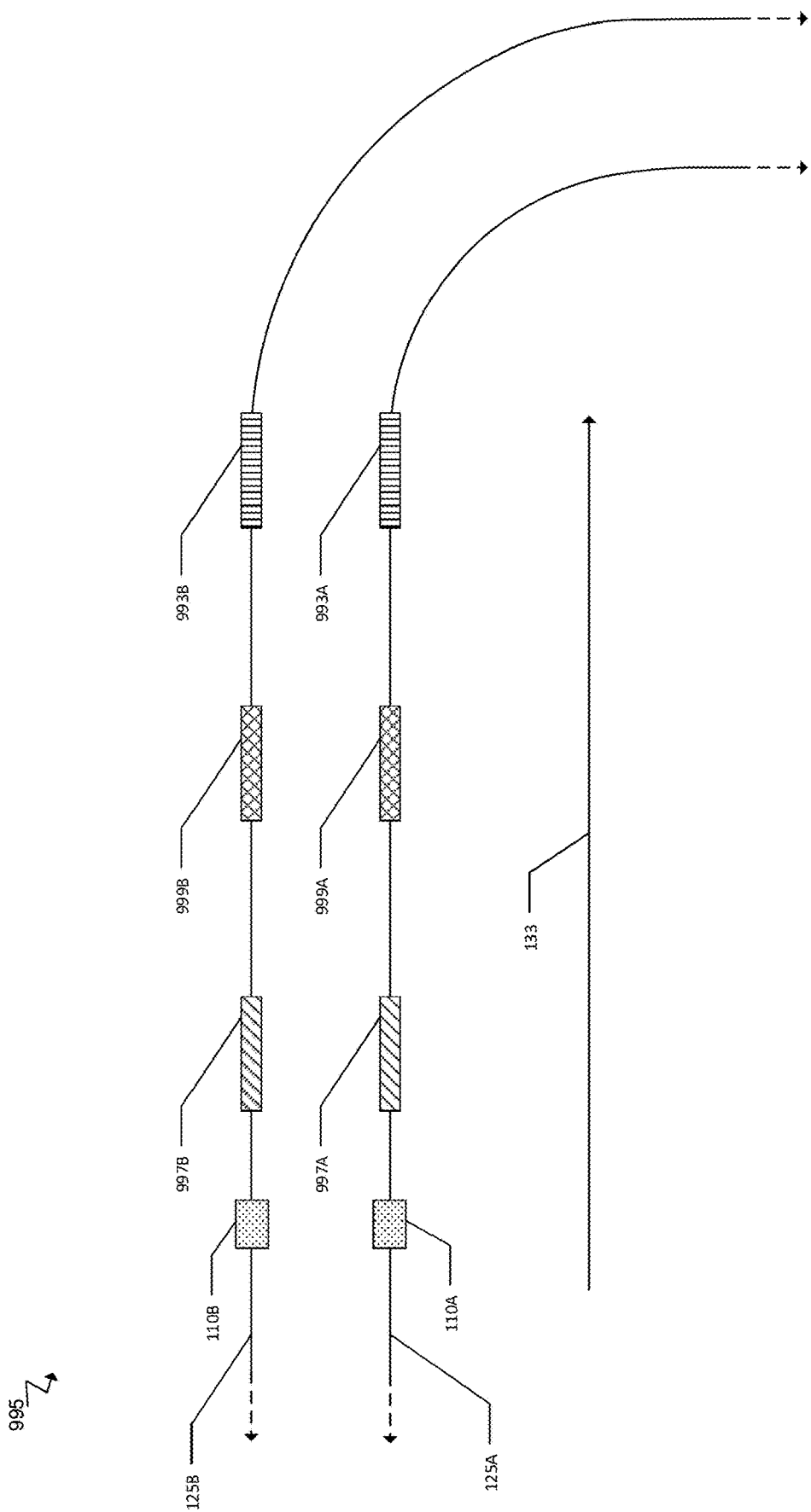
FIG. 9A illustrates a logical view of a plurality of electromagnetic engines detecting a plurality of rail section, as shown from a top perspective of the rails.

FIG. 9A illustrates a logical view 995 of a plurality of electromagnetic engines detecting a plurality of rail sections, as shown from a top perspective of the rails 125A, 125B. The rail 125A contains a plurality of treated sections viz. a treated section 993A, a treated section 997A, and a treated section 999A. Similarly, the rail 125B contains a plurality of treated sections viz. a treated section 993B, a treated section 997B, and a treated section 999B. In one aspect, the treated sections 993A, 993B, 997A, 997B, 999A, 999B may have a treated area near the rail head as described in FIG. 8A and FIG. 8B above viz. the treated areas 965A, 965B, 967A, 967B.

In one aspect, the treated section of one rail may be used to determine location and related velocity. For example, the treated sections 993A, 997A, 999A may be utilized without any readings of the rail 125B because one can assume the electromagnetic engines 110A, 110B are traveling substantially in parallel. In another aspect, the bogie assembly 100 may simply be deployed with one electromagnetic engine (e.g., electromagnetic engine 110A) such that location and velocity may be determined without the need for an additional electromagnetic engine on the opposite wheelset.

The electromagnetic engines 110A, 110B may be utilized to determine the velocity of the bogie assembly (not shown) as the electromagnetic engines 110A, 110B traverse the rails 125A, 125B. As the electromagnetic engines 110A, 110B proceed along the direction of travel 133, the electromagnetic engines 110A, 110B may attempt to detect a start signature in the rails 125A, 125B. As the electromagnetic engines 110A, 110B enter the respective treated sections 997A, 997B, the electromagnetic engines 110A, 110B may detect the start signature associated with the sections 997A, 997B. The electromagnetic engines 110A, 110B may then start a chronometer.

As the electromagnetic engines 110A, 110B continue to proceed along the direction of travel 133, the electromagnetic engines 110A, 110B may begin attempting to detect the end signature. One of skill in the art will appreciate that the chronometer will continue to increase the elapsed time until the end signature is detected. In the instant figure, the end signature may be detected in the treated sections 999A, 999B. The electromagnetic engines 110A, 110B may then stop the chronometer. Then, the electromagnetic engines 110A, 110B may determine the velocity using distance traveled and elapsed time.

In one aspect, the end signature defined by the treated sections 999A, 999B may be utilized as a start signature for a following segment of track. For example, the electromagnetic engines 110A, 110B may use the treated sections 999A, 999B as the start signature and the treated sections 993A, 993B as the end signatures. In one aspect, the velocity between the treated sections 999A, 999B and the treated sections 993A, 993B may be calculated as the electromagnetic engines 110A, 110B move along the direction of travel 133.

Figure 9B:
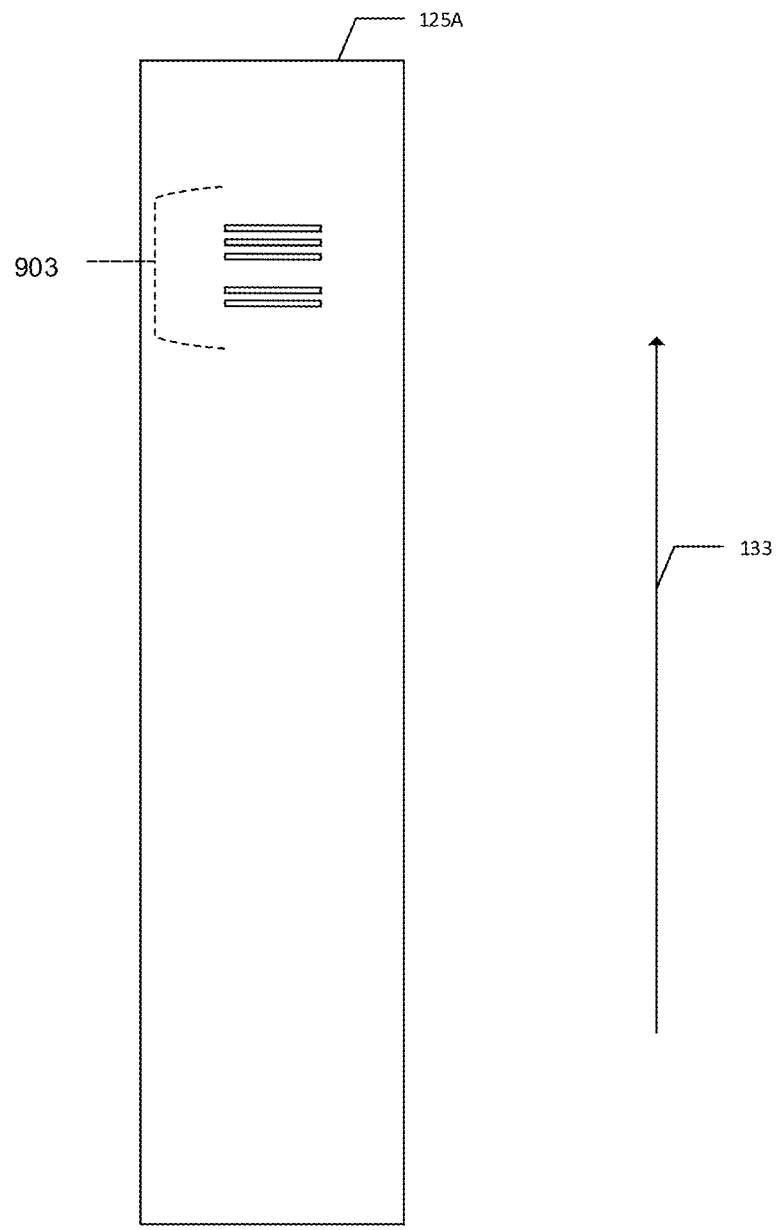
FIG. 9B illustrates a planar view of a rail, as shown from a top perspective.

FIG. 9B illustrates a planar view of the rail 125A, as shown from a top perspective. The rail 125A is depicted with a plurality of glyphs 903 formed in the top face i.e., near the crown of the rail head. In one aspect, the plurality of glyphs 903 is etched into the top face of the rail 125A. In another aspect, the plurality of glyphs 903 is formed during the production of the rail 125A. The plurality of glyphs 903 may be one implementation of the unique metallurgical signature referenced herein. Given that the plurality of glyphs 903 is physically part of the surface of the rail 125A, the resulting magnetic fields (e.g., as shown in FIG. 1F) will be affected by the absence of metallurgical material at the rail head.

In one aspect, the variation in amplitude of an eddy current may be detected by the sensors 120A, 120B, 120C, 120D, 120E, 120F. The detected variation in amplitude of an eddy current may form the start signature as described in the processes herein. Further, the detected variation in amplitude of an eddy current may form the end signature as described herein. The first signature or the second signature may be associated with a real-world location.

Figure 10:
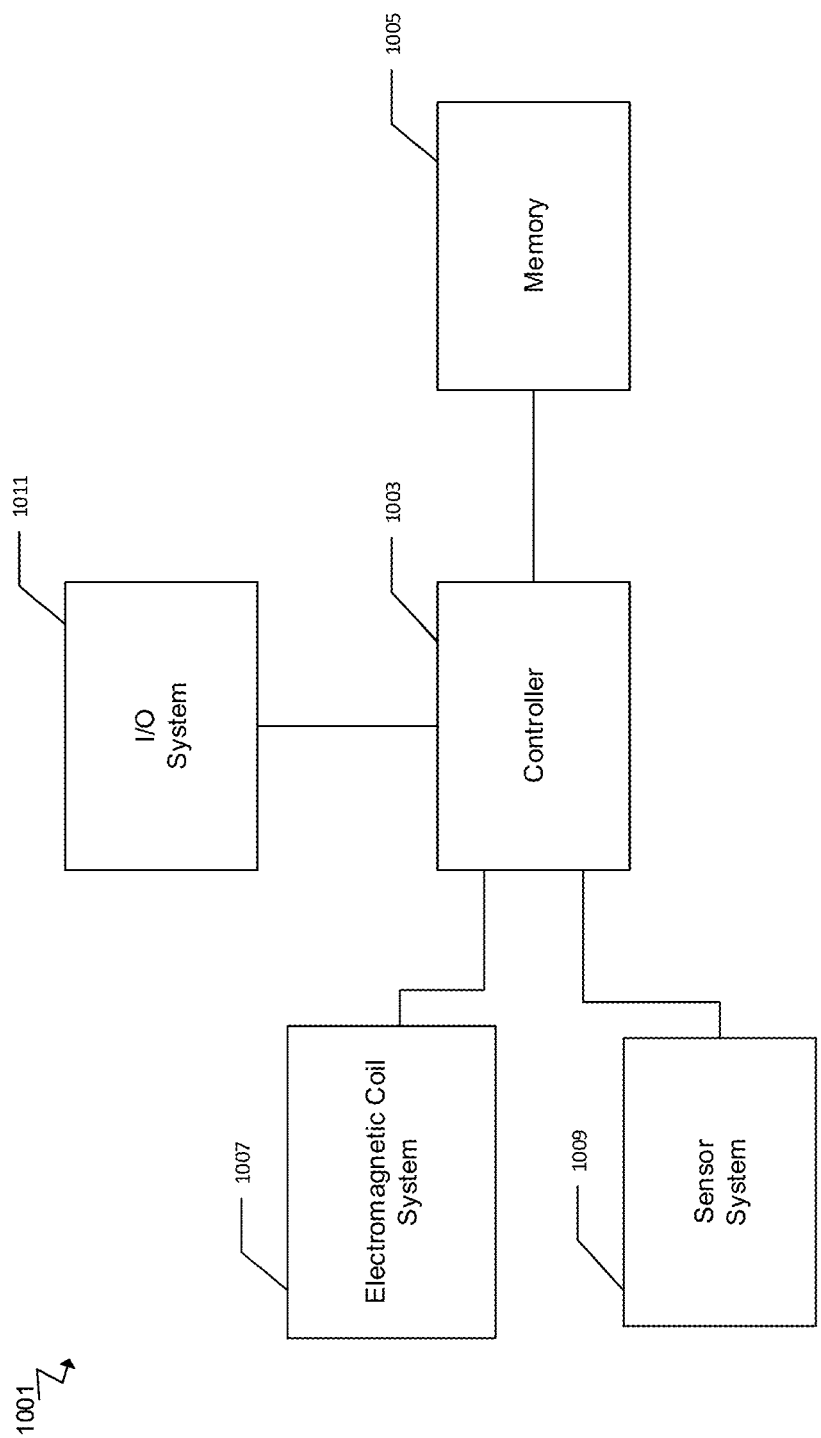
FIG. 10 is a block diagram of a system operable for use with electromagnetic engines.

FIG. 10 is a block diagram of a system 1001 operable for use with the electromagnetic engines 110A, 110B. One of skill in the art will appreciate that the electromagnetic engine 110A may require a hardware and software solution, similar to the system 1001, in order to manage the operation of the electromagnetic engine 110A. The system 1001 may be configured to operate within the electromagnetic engine 110A, within the bogie assembly 100, on a server, in the cloud, or combination thereof. For example, a deployment within a deep tunnel may require stand-alone implementations where much of the logic within the system 1001 is resident on the bogie assembly 100. In contrast, a deployment on standard, above-ground rails may have an implementation of the system 1001 that utilizes remote processing since communication is accessible and reliable.

A controller 1003 may be operatively connected a memory 1005, an electromagnetic coil system 1007, a sensor system 1009, and an I/O system 1011. The controller 1003 may be implemented in hardware, software, or combination thereof. One of skill in the art will appreciate how an operating environment may affect selection of a controller. For example, one of skill in the art may implement the controller 1003 as an ASIC or as software running on a general-purpose computer (e.g., an x86 machine).

In one aspect, the controller 1003 may manage the coils 115A, 115B, 115C, 115D, 115E, 115F via the electromagnetic coil system 1007. For instance, the controller 1003 may so communicate with the electromagnetic coil system 1007 in order to ascertain the presence and location of a defect within the rail 125A. In another aspect, the controller 1003 may have algorithms operable to classify a defect. For example, the controller 1003 may be configured to determine whether a defect is a head check (e.g., the defect 983) or a subsurface crack (e.g., the defect 981A).

The sensor system 1009 may be operable to managing the sensors 120A, 120B, 120C, 120D, 120E, 120F. The sensor system 1009 may be configured to perform triangulation based on a number of observations. In one aspect, the controller 1003 may instruct the sensor system 1009 to gather observations from the sensor 120A and the sensor 120C in order to view a defect from two discrete perspectives. For example, the two discrete perspectives could be based on the axis 997A and the axis 977C. In one aspect, the sensor system 1009 is operable to manage the plurality of sensors 930 to generate the view 952.

The memory 1005 is operable to store instructions, data, information, etc. in either volatile or non-volatile storage. The processes described herein may be configured to be stored in the memory 1005, in one aspect. In another aspect, the processes described herein may be encoded into the controller 1003 (e.g., as an ASIC). One of skill in the art will appreciate that the memory 1005 may take many forms in a commercial implementation of the disclosed solution.

The I/O system 1011 is generally operable to communicate information within the system 1001 itself or to a remote system (e.g., cloud computing environments). In one aspect, the I/O system 1011 may be operable to gather GPS location data from cellular-based triangulation, satellite, or combination thereof. In another aspect, the I/O system 1011 may be a 5G modem operable to communicate wirelessly with the Internet.

The I/O system 1011 may be connected to other implementations of the system 1001 such that the system 1001 may be considered a node within a larger system of many implementations of the system 1001. For example, a first bogie assembly may communicate calibration data to a second bogie assembly via each I/O system 1011 of the bogie assemblies, respectively. Such communication may be over the Internet or via a local area network (e.g., ethernet, Bluetooth, WIFI, etc.).

The electromagnetic coil system 1007 is generally operable to manage the coils 115A, 115B, 115C, 115D, 115E, 115F. Further, the electromagnetic coil system 1007 may manage the parameters of the electromagnetic field (e.g., phase, power, etc.).

FIG. 11A-11D illustrate a process 1101 for the operation of the electromagnetic engine 110A. The process 1101 begins at the start block 1105 and proceeds to the decision block 1107. The process 1101 may determine whether the electromagnetic engine 110A is in a calibration mode or in an operating mode.

The calibration mode is generally related to adjusting settings and parameters in the electromagnetic engine 1105, often via training data. In one aspect, the calibration mode may utilize artificial intelligence and deep learning. In one aspect, the electromagnetic engine 110A may be calibrated on a nominal section of rail (e.g., that illustrated in FIG. 3E). Such calibration enables the electromagnetic engine 110A, when operating, to perform detection of defects since said defects may affect the electromagnetic field, the eddy current, or combination thereof.

Figure 11A:
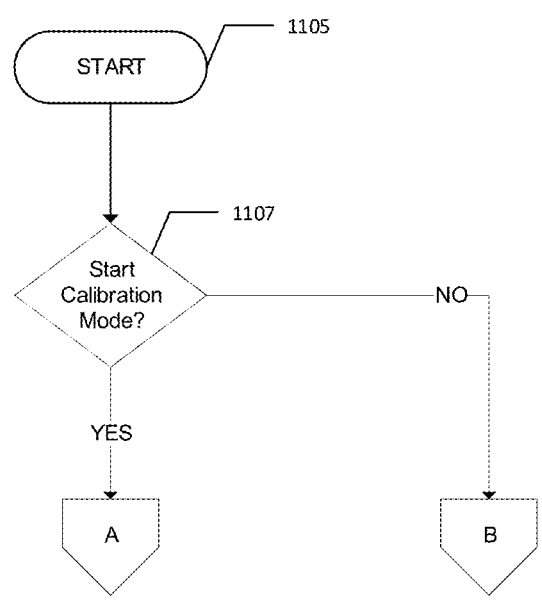
FIG. 11A illustrates a process for the operation of an electromagnetic engine.
Figure 11B:
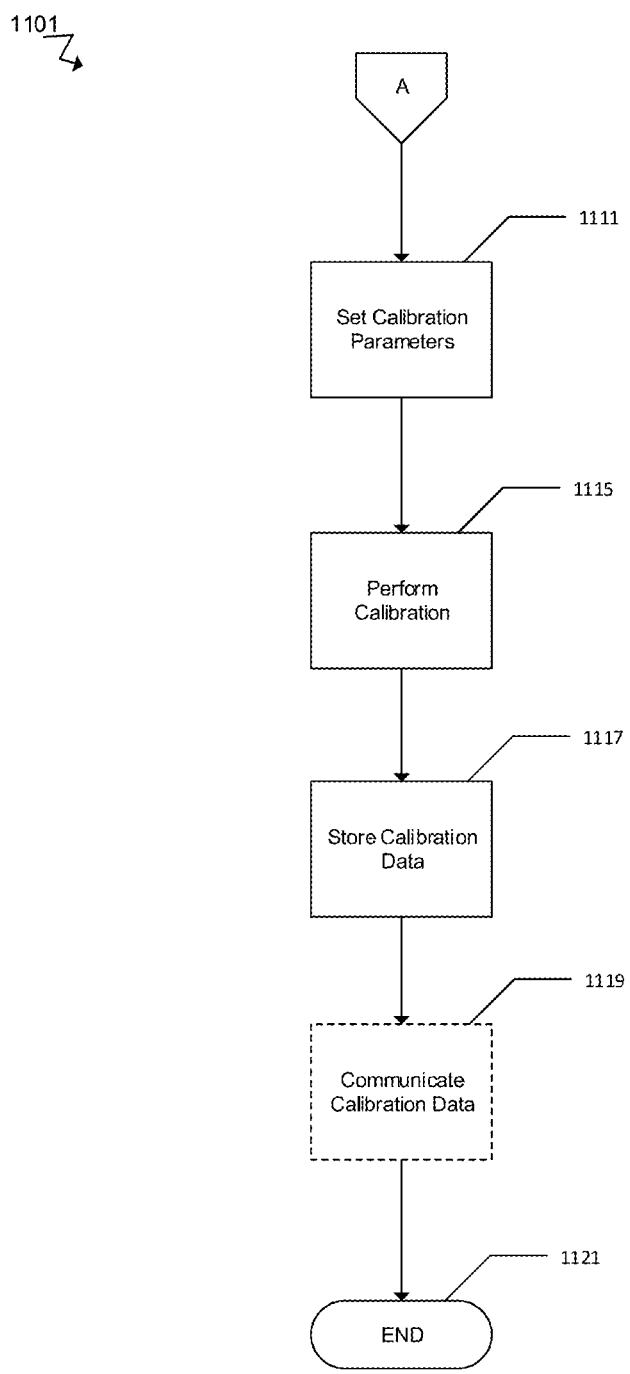
FIG. 11B illustrates a process for the operation of an electromagnetic engine.

If the process 1101 is in a calibration mode, the process 1101 proceeds via the YES branch to callout reference A. Turning to FIG. 11B, the process 1101 proceeds to the block 1111 where the process 1101 may set the calibration parameters 1111. For example, the process 1101 may communicate via the I/O system 1011 to a remote server that instructs the system 1001 to calibrate along a particular section of rail that is representative of what the operator considers to be nominal rail. The process 1101 then proceeds to the block 1115.

At the block 1115, the process 1101 may perform the calibration. In one aspect, the electromagnetic engines 110A, 110B may be mounted to the bogie assembly 100 and be physically traversing the rails 125A, 125B. As the bogie assembly 100 moves along the rails 125A, 125B, the process 1101 may capture measurements and data from the nominal environment. The calibration may be iterative, performed in parallel, repeated, utilize AI, etc. The process 1101 then proceeds to the block 1117.

At the block 1117, the process 1101 stores calibration data gathered at the block 1115 to the memory 1005. When writing the calibration to persistent storage, the process 1101 may augment the calibration data with additional metadata helpful to operators and technicians, any of which may be tasked with repair operations. The process 1101 then proceeds to the block 1119.

At the block 1119, the calibration data may be communicated via the I/O system 1011 to another system operable to manage and interpret the calibration data as part of remote operation of the system 1001. The instant block is depicted with dotted lines because the process 1101 may be configured to have each electromagnetic engine manage the calibration data without substantial communication to other devices. In one aspect, the process 1101 may communicate the calibration data to other electromagnetic engines. For example, many electromagnetic engines may be mounted to a particular bogie assembly. Further, the electromagnetic engines may form a mesh network wherein calibration data is shared and potentially further calibrated by the plurality of electromagnetic engines, some of which are acting in concert. The process 1101 then proceeds to the end block 1121 and terminates.

Figure 11C:
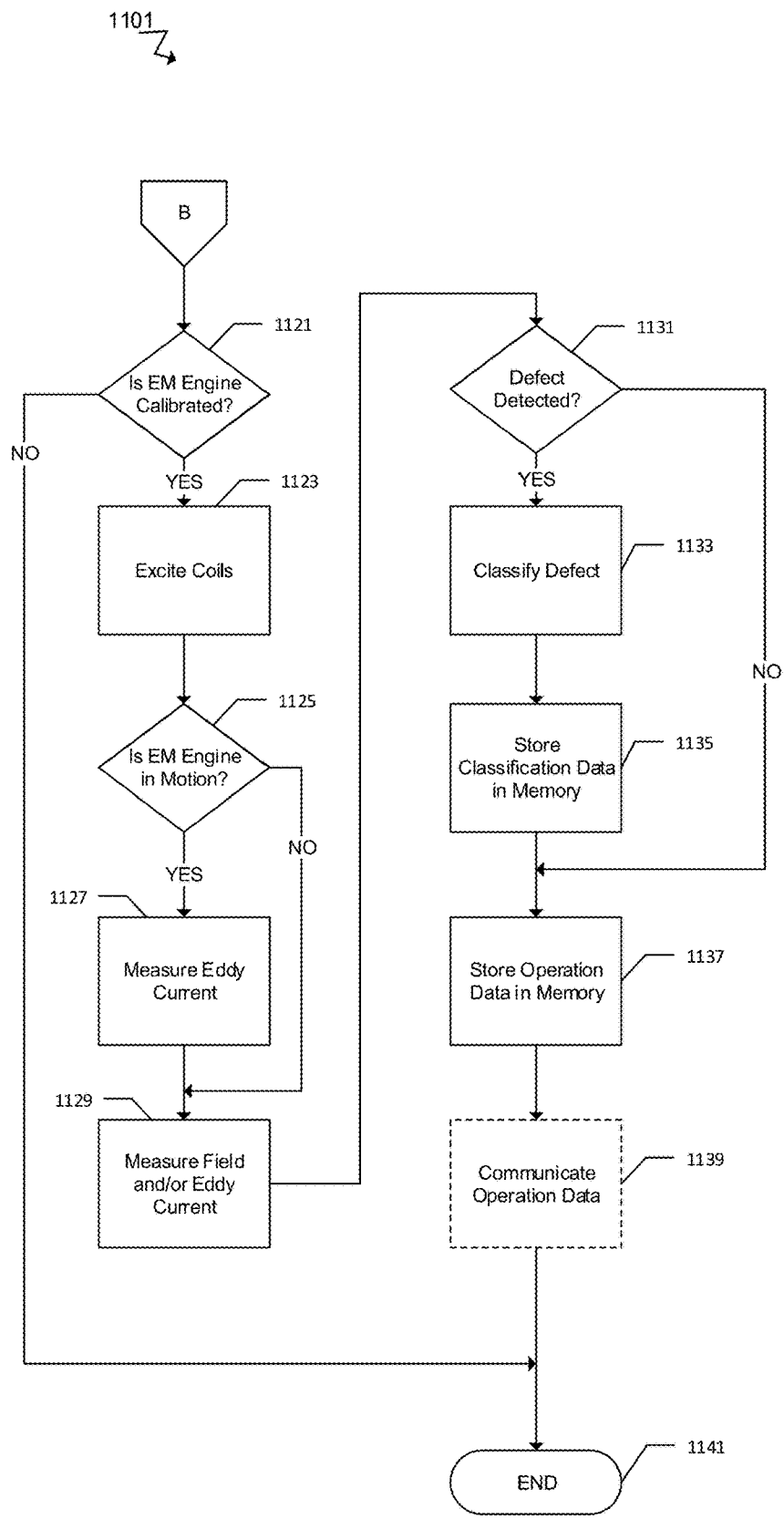
FIG. 11C illustrates a process for the operation of an electromagnetic engine.

Returning to the decision block 1107, if the process 1101 is not in a calibration mode, the process 1101 proceeds along the NO branch to the callout B. Turning to FIG. 11C, the process 1101 proceeds to the decision block 1121. At the decision block 1121, the process 1101 may determine whether the electromagnetic engine 110A is calibrated. If the electromagnetic engine 110A has not been calibrated, the process 1101 proceeds along the NO branch to the end block 1141 and terminates.

Returning to the decision block 1121, if the process 1101 determines that the electromagnetic engine 110A is calibrated, the process 1101 proceeds along the NO branch to the block 1123. At the block 1123, the process 1101 may excite the coils 115A, 115B, 115C. In one aspect, the process 1101 invokes the functionality of the electromagnetic coil system 1007. The process 1101 then proceeds to the decision block 1125.

At the decision block 1125, the process 1101 may determine whether the bogie assembly 100 is in motion. If the bogie assembly 100 is in motion, then an eddy current may be generated and measured in order to scan the rail 125A for defects and other anomalies. If the electromagnetic engine is not in motion, the process 1101 proceeds along the NO branch to the block 1129. Returning to the decision block 1125, the process 1101 may determine the bogie assembly 100 is in motion and then proceed along the YES branch to the block 1127.

At the block 1127, the process 1101 may measure the eddy current in order to observe the condition of the rail 125A (e.g., as described in FIG. 5A through FIG. 6 above). In one aspect, the controller 1003 may communicate with the electromagnetic coil system 1007 to excite the coils 115A, 115B, 115C, 115D, 115E, 115F such that a magnetic field is generated. Further, when the bogie assembly 100 is in motion, an eddy current may be generated. The sensor system 1009 may gather measurements of the eddy current such that defects may be measured and stored by the process 1101. In one aspect, the measured eddy current may be further associated with data such as bogie velocity, field strength, rail profile, rail metallurgical composition, deviation from calibrated values, etc. The process 1101 then proceeds to the block 1129.

At the block 1129, the process 1101 may measure the electromagnetic field generated by the electromagnetic coil system 1007. In one aspect, the sensor system 1009 is utilized to gather measurements of the electromagnetic fields. In another aspect, the sensor system 1009 may gather measurements of a generated eddy current, if one is present as a result of longitudinal motion of the electromagnetic engines 110A, 110B. The sensor system 1009 may rely on Hall-effect sensors, coils, etc. In one aspect, the field measured may resemble the electromagnetic magnetic fields 160A, 160B for nominal sections of rail. However, the electromagnetic fields may behave differently in areas where material is damaged, missing, warped, cracked, corroded, etc. For example, the electromagnetic fields at or near the defect 983 above will be different from the nominal electromagnetic fields generated during the calibration. The process 1101 then proceed to the decision block 1131.

At the decision block 1131, the process 1101 determines whether a defect has been detected. In one aspect, the sensor system 1009 may gather information related to the electromagnetic field, the generated eddy current, or combination thereof. If a defect has not been detected, the process 1101 proceeds along the NO branch to the block 1137. Returning to the decision block 1131, the process 1101 may detect a defect and proceed along the YES branch to the block 1133.

At the block 1133, the process 1101 may classify the defect. As described above, the process 1101 may calibrate the electromagnetic engine 110A and the related system 1001. When a defect is encountered, the process 1101 may compare the measured electromagnetic field and generated eddy current (if available) such that the measured values may be compared with nominal values. Deviations from the nominal values may be further processed by the controller 1003, a remote server, the cloud, or combination thereof. Some defects may be detected by an amplitude change of the eddy current or a variation within the magnetizing field itself. The process 1101 then proceeds to the block 1135.

At the block 1135, the process 1101 stores the classification data in memory. In one aspect, the memory 1005 is utilized by the process 1101 to store the classification data to persistent storage (e.g., flash memory). Additional data may be further associated with the classification data beyond the type of the defect (e.g., head check). For example, further data associated with a defect may be location, time of discovery, weather conditions, emergency warnings, etc. The process 1101 then proceeds to the block 1137.

At the block 1137, the process 1101 stores operation data in the memory 1005. Operation data generally relates to the ongoing measurements of the bogie assembly 100 while in operation on the rails 125A, 125B. In one aspect, the operation data may be velocity, position, grade, electromagnetic field strength, etc. Such operation data may be in addition to any classification data processed at the blocks 1133, 1135 above. Operation data may be innocuous information when defects are not detected; however, such constant operation data may inform other systems in operation within the transportation network. The process 1101 then proceeds to the block 1139.

At the block 1139, the process 1101 may, optionally, communicate operation data. In one aspect, the operation data (including any classification data) may be communicated to a remote server via the I/O system 1011. In another aspect, the process 1001 may communicate from a first instance of the system 1001 to a second instance of the system 1001. Such communication may be within a plurality of electromagnetic engines, with substantially minimal communication outside the bogie assembly 100 itself. For instance, the bogie assembly 100 may abstract the minute detail of the electromagnetic engines 110A, 110B in order to have the locomotive and operator have more actionable information at hand. One of skill in the art will appreciate how such operational data (including any classification data) may be communicated based on operating conditions and real-world constraints (e.g., safety, budget, liability, etc.). The process 1101 then proceeds to the end block 1141 and terminates.

Figure 11D:
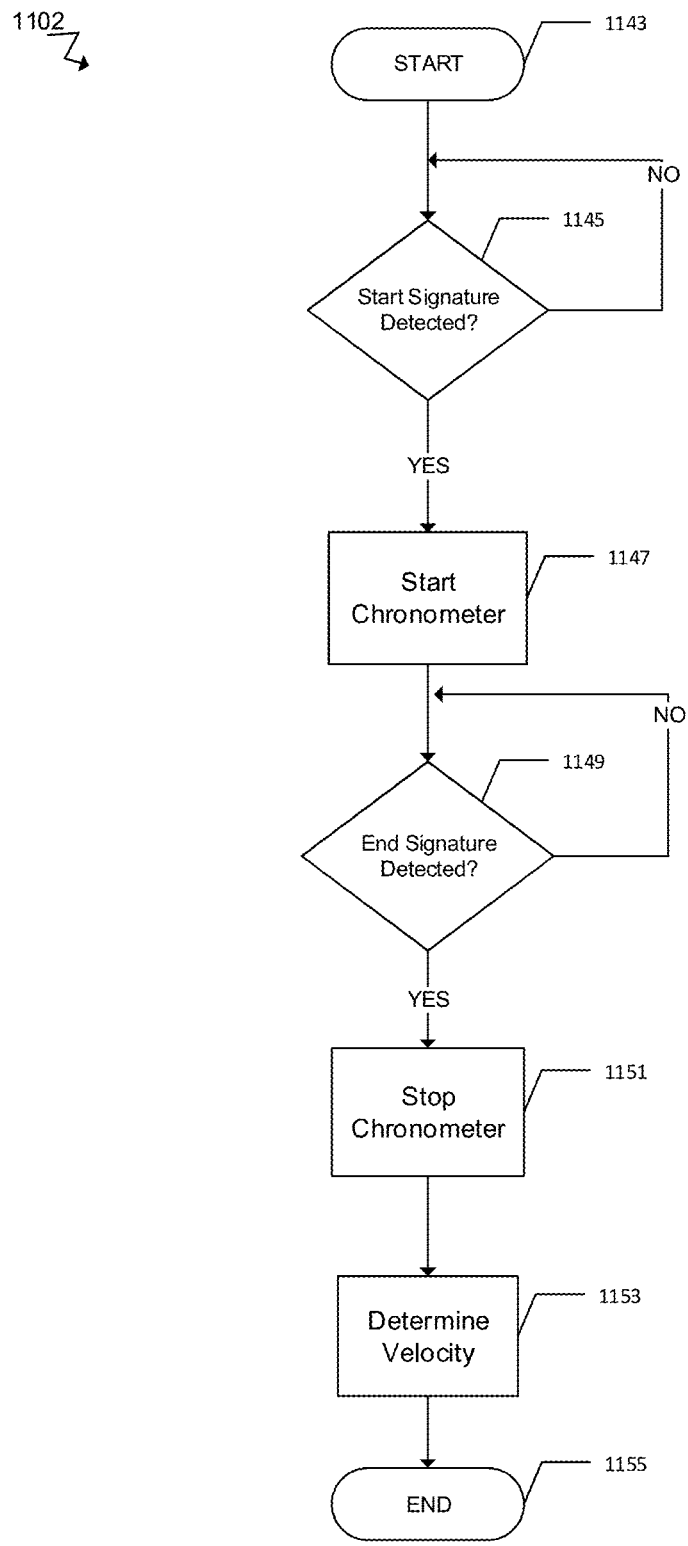
FIG. 11D illustrates a process for the operation of an electromagnetic engine.

FIG. 11D illustrates a process 1102 for the operation of the electromagnetic engine 110A. The process 1102 begins at the start block 1143. The process 1102 proceeds to the decision block 1145 where a determination is made whether a start signature is detected by the electromagnetic engines 110A, 110B.

The start signature may be a signal received by the sensors 120A, 120B, 120C, 120D, 120E, 120F that corresponds to a real-world location of an area of the rails 125A, 125B. In one aspect, the system 1001 may be utilized viz. the sensor system 1009.

In one aspect, the treated areas 965A, 965B, 967A, 967B may be deployed with a substantially unique metallurgical profile in order to form the start signature for the electromagnetic engines 110A, 110B to detect while the bogie assembly 100 is traveling on the rails 125A, 125B. The substantially unique metallurgical profile may be stored in a memory prior to deployment such that the process 1102 may utilize said profile to identify the same treated areas 965A, 965B, 967A, 967B when deployed in the field. Further, the real-world location of the deployed, treated areas 965A, 965B, 967A, 967B may be stored in a memory such that the treated areas 965A, 965B, 967A, 967B (and the related start signature) may be correlated to the real-world location.

In one aspect, the treated areas 965A, 965B, 967A, 967B may be detected to form the start signature by measuring an amplitude variation of an eddy current formed by the traversal of the electromagnetic engines 110A, 110B across the rails 125A, 125B. In another aspect, the treated areas 965A, 965B, 967A, 967B may be detected to form the start signature by measuring the inductance at the coils 115A, 115B, 115C, 115D, 115E, 115F. In another aspect, the process 1101 may be utilized in conjunction with the system 1001 to measure the start signature viz. the sensor system 1009.

At the decision block 1145, if the process 1102 is unable to correlate the received signal from the electromagnetic engines 110A, 110B to a start signature based on the treated areas 965A, 965B, 967A, 967B, then the process 1102 proceeds along the NO branch back to the decision block 1145. If the process 1102 is able to correlate the signal received by the electromagnetic engines 110A, 110B to a start signature based on the treated areas 965A, 965B, 967A, 967B, then the process 1102 proceeds along the YES branch to the block 1147.

At the block 1147, the process 1102 starts a chronometer to measure an elapsed time which substantially begins when the start signature is detected. The elapsed time may be utilized later to calculate velocity, as described herein. The process 1102 proceeds to the decision block 1149.

At the decision block 1149, the process 1102 determines whether an end signature has been detected by the electromagnetic engines 110A, 110B. In one aspect, the treated areas 965A, 965B, 967A, 967B may be deployed with a substantially unique metallurgical profile in order to form the end signature for the electromagnetic engines 110A, 110B to detect while the bogie assembly 100 is traveling on the rails 125A, 125B. The substantially unique metallurgical profile may be stored in a memory prior to deployment such that the process 1102 may utilize said profile to identify the same treated areas 965A, 965B, 967A, 967B when deployed in the field. Further, the real-world location of the deployed, treated areas 965A, 965B, 967A, 967B may be stored in a memory such that the treated areas 965A, 965B, 967A, 967B (and the related start signature) may be correlated to the real-world location.

One of skill in the art will appreciate that the process 1101 may be utilized to calibrate the electromagnetic engines 110A, 110B to generate the start and end signatures. For instance, the calibration in process 1101 may contain operations to calibrate the sensor system 1009 by measuring a training set of nominal profiles.

In one aspect, the treated areas 965A, 965B, 967A, 967B may be detected to form the end signature by measuring the amplitude variation of an eddy current formed by the traversal of the electromagnetic engines 110A, 110B across the rails 125A, 125B. In another aspect, the treated areas 965A, 965B, 967A, 967B may be detected to form the end signature by measuring the inductance at the coils 115A, 115B, 115C, 115D, 115E, 115F. In one aspect, the system 1001 may utilize the sensor system 1009 by command from the controller 1003 which then may communicate data from the memory 1005 to the I/O system 1011. A remote server may be in communication with the system 1001 via the I/O system 1011.

If the end signature is not detected, the process 1102 proceeds along the NO branch back to the decision block 1149. If the end signature is detected, the process 1102 proceeds along the YES branch to the block 1151. At the block 1151, the chronometer, started at the block 1147, is stopped. An elapsed time is then calculated. The process 1102 then proceeds to the block 1153.

At the block 1153, the process 1102 determines the velocity of the bogie assembly 100. The process 1102 utilizes (1) the elapsed time determined at the blocks 1147, 1151 and (2) the real-world locations of the detected start signature and the detected end signature in order to calculate velocity. The process 1102 then proceeds to the end block 1155 and terminates.

Figure 12:
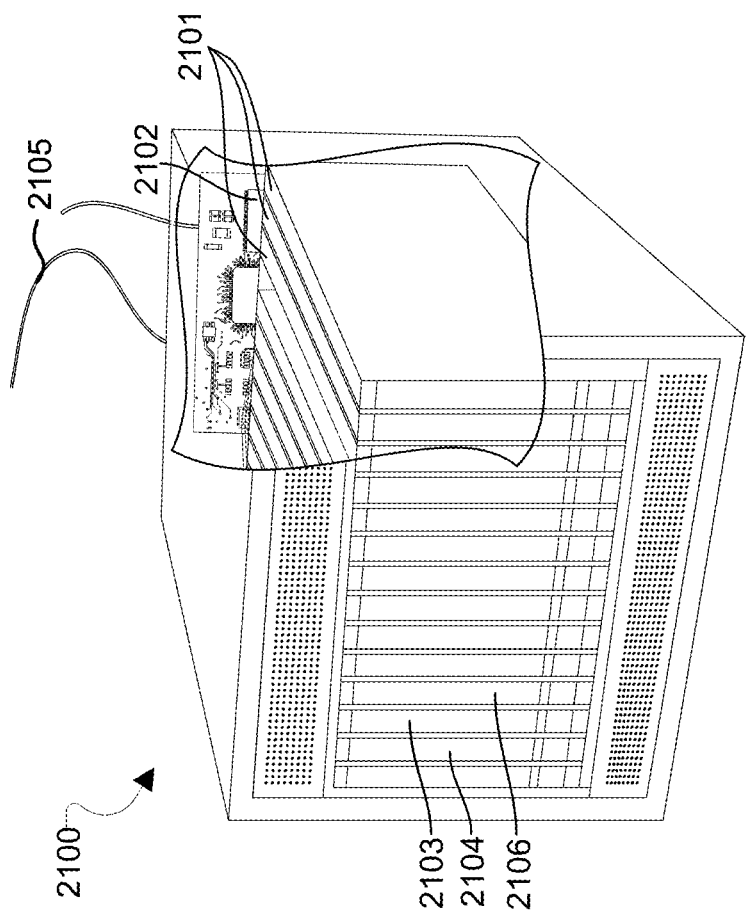
FIG. 12 is a block diagram illustrating a server suitable for use with the various aspects described herein.

FIG. 12 is a diagram illustrating a server 8000 suitable for use with the various aspects described herein. The server 8000 may include one or more processor assemblies 8001 (e.g., an x86 processor) coupled to volatile memory 8002 (e.g., DRAM) and a large capacity nonvolatile memory 8004 (e.g., a magnetic disk drive, a flash disk drive, etc.). As illustrated in the instant figure, processor assemblies 8001 may be added to the server 8000 by inserting them into the racks of the assembly. The server 8000 may also include an optical drive 8006 coupled to the processor 8001. The server 8000 may also include a network access interface 8003 (e.g., an ethernet card, WIFI card, etc.) coupled to the processor assemblies 8001 for establishing network interface connections with a network 8005. The network 8005 may be a local area network, the Internet, the public switched telephone network, and/or a cellular data network (e.g., LTE, 5G, etc.).

In one aspect, the server 8000 may be connected to the electromagnetic engines 110A, 110B in order to measure, store, and process data collected by the sensors 120A, 120B, 120C, 120D, 120E, 120F. Further, the processes 1101, 1102 may be stored and executed by the server 8000. In another aspect, the server 8000 may control the power levels applied to the coils 115A, 115B, 115C, 115D, 115E, 115F. In one aspect, the system 1001 may be in communication with the server 8000. As discussed with respect to the process 1101, 1102, the I/O system 1011 may be in communication with a remote server—such remote server may be similar to the server 8000.

One of skill in the art will appreciate that any of the components of the server 8000 may be designed into an implementation of the electromagnetic engine 110A. For example, the electromagnetic engines 110A, 110B may be controlled by a processor embedded into the either one of the electromagnetic engines 110A, 110B. In one aspect, the processor assemblies 8001 may be a low-power ARM architecture chipset embedded into the bogie assembly 100, the electromagnetic engines 110A, 110B, or combination thereof. With cloud-computing and distributed processing, the processes 1101, 1102 may be executed within the electromagnetic engines 110A, 110B or a remote server (similar to the server 8000).

The preceding description of the disclosed aspects is provided to enable any person skilled in the art to make, implement, or use the claims. Various modifications to these aspects will be readily apparent to those skilled in the art, and the generic principles defined herein may be applied to other aspects without departing from the scope of the claims. Thus, the present disclosure is not intended to be limited to the aspects illustrated herein but is to be accorded the widest scope consistent with the claims disclosed herein.

What is claimed is:

1. An electromagnetic engine configured to being mounted on a wheeled bogie assembly, the bogie assembly being configured to operate on a rail, the electromagnetic engine comprising:
    a first electromagnetic sensor, the first electromagnetic sensor being disposed along a first axis;
    a second electromagnetic sensor, the second electromagnetic sensor being disposed along a second axis;
    a third electromagnetic sensor, the third electromagnetic sensor being disposed along a third axis;
    a plurality of electromagnetic coils comprised of a first electromagnetic coil, a second electromagnetic coil and a third electromagnetic coil, the plurality of electromagnetic coils being configured to generate an electromagnetic field, the electromagnetic field being configured to penetrate the rail, the electromagnetic field being further configured to generate an eddy current when the electromagnetic engine is in motion, the first coil and the third coil being disposed along a fourth axis, the second coil being disposed along a fifth axis, the fourth axis being disposed below the fifth axis; and
    a controller, coupled with a memory, the controller configured to:
        measure, at the first electromagnetic sensor, a first reading of the generated electromagnetic field and the generated eddy current;
        measure, at the second electromagnetic sensor, a second reading of the generated electromagnetic field and the generated eddy current;
        measure, at the third electromagnetic sensor, a third reading of the generated electromagnetic field and the generated eddy current; and
        triangulate the first reading, the second reading, and the third reading to form a first signature.

2. The electromagnetic engine of claim 1, wherein the controller is further configured to:
    receive a first signal, the first signal indicating the controller is in a calibration mode; and store, in the memory, the first signature as a calibration signature, the calibration signature being generated from a nominal section of the rail and being configured for comparison with a second signature.

3. The electromagnetic engine of claim 2, wherein the storing is performed on a cloud computing platform, the cloud computing platform being remote from the electromagnetic engine.

4. The electromagnetic engine of claim 1, wherein the controller is further configured to:
receive a second signal, the second signal indicating the controller is in an operation mode;
store, in the memory, the first signature as a first operation signature, the first operation signature being generated from a first operating section of the rail and being configured for comparison with a first calibration signature;
compare the first operation signature with the first calibration signature to form a third signature, the third signature being configured to classify a first difference in the rail; and
store, in the memory, the third signature.

5. The electromagnetic engine of claim 4, wherein the first difference is a defect being a head check, a crack, a deformation, a missing portion of material, a missing clip, a damaged clip, a longitudinal profile defect, or a combination thereof.

6. The electromagnetic engine of claim 1, wherein the first electromagnetic sensor, the second electromagnetic sensor, and the third electromagnetic sensor are each selected from the group consisting of: a Hall-effect sensor, an electromagnetic coil, and a magneto-resistive device.

7. The electromagnetic engine of claim 1, wherein the rail further comprises:
a treated portion, the treated portion being disposed proximal to a rail head, the treated portion further being of a different metallurgical profile than a second portion of the rail, the second portion of the rail being different than the treated portion.

8. The electromagnetic engine of claim 7, wherein the treated portion is manufactured by heat treatment, metal alloying, mechanical treatment, or a combination thereof.

9. The electromagnetic engine of claim 8, wherein the treated portion is associated with a real-world location, further wherein the controller is further configured to:
detect the treated portion having a real-world location associated therewith;
store, in the memory, additional data related to the detection of the treated portion, the additional data including time, velocity of the electromagnetic engine, or a combination thereof.

10. The electromagnetic engine of claim 8, wherein the treated portion contains a plurality of glyphs, the plurality of glyphs being associated with a message.

11. The electromagnetic engine of claim 1, wherein the first electromagnetic sensor, the second electromagnetic sensor, and the third electromagnetic sensor are collectively disposed in an array of electromagnetic sensors, the array being substantially lateral to a direction of travel along the rail, further wherein the controller is further configured to form a time-based image of the rail based on measurements gathered by the array of electromagnetic sensors.

12. A method for an electromagnetic engine configured to being mounted on a wheeled bogie assembly, the wheeled bogie assembly being configured to operate on a rail, the method comprising:
controlling, at a controller, a first electromagnetic sensor, the first electromagnetic sensor being disposed along a first axis, the controller being coupled to a memory;
controlling, at the controller, a second electromagnetic sensor, the second electromagnetic sensor being disposed along a second axis;
controlling, at the controller, a third electromagnetic sensor, the third electromagnetic sensor being disposed along a third axis;
controlling, at the controller, a plurality of electromagnetic coils comprised of a first electromagnetic coil, a second electromagnetic coil and a third electromagnetic coil, the plurality of electromagnetic coils being configured to generate an electromagnetic field, the electromagnetic field being configured to penetrate the rail and being configured to generate an eddy current when the electromagnetic engine is in motion, the first coil and the third coil being disposed along a fourth axis, the second coil being disposed along a fifth axis, the fourth axis being disposed below the fifth axis;
measuring, at the first electromagnetic sensor, a first reading of the generated electromagnetic field and the generated eddy current;
measuring, at the second electromagnetic sensor, a second reading of the generated electromagnetic field and the generated eddy current;
measuring, at the third electromagnetic sensor, a third reading of the generated electromagnetic field and the generated eddy current; and
triangulating the first reading, the second reading, and the third reading to form a first signature.

13. The method of claim 12, the method further comprising:
receiving, at the controller, a first signal, the first signal indicating a calibration mode; and
storing, in the memory, the first signature as a calibration signature, the calibration signature being generated from a nominal section of the rail and being configured for comparison with a second signature.

14. The method of claim 12, wherein the storing is further performed on a cloud computing platform, the cloud computing platform being remote from the electromagnetic engine.

15. The method of claim 12, the method further comprising:
receiving a second signal, the second signal indicating an operation mode;
storing, in the memory, the first signature as an operation signature, the operation signature being generated from an operating section of the rail and being configured for comparison with a calibration signature;
comparing, at the controller, the operation signature with the calibration signature to form a third signature, the third signature being configured to classify a difference in the rail; and
storing, in the memory, the third signature.

16. The method of claim 15, wherein the difference is a defect being a head check, a crack, a deformation, a missing portion of material, a missing clip, a damaged clip, a longitudinal profile defect, or a combination thereof.

17. The method of claim 12, wherein the method further comprises:
detecting, at the controller, a treated portion of the rail, the treated portion having a different metallurgical profile than a second portion of the rail, the treated portion further having a real-world location associated therewith;

storing, in the memory, additional data related to the detection of the treated portion, the additional data including time, velocity of the electromagnetic engine, or a combination thereof.

18. The method of claim 17, the method further comprising:
   detecting a plurality of glyphs, the plurality of glyphs being part of the treated portion and being associated with a message.

19. The method of claim 12, the method further comprising:
   generating a time-based image of the rail based on measurements gathered by an array of electromagnetic sensors wherein the first electromagnetic sensor, the second electromagnetic sensor, and the third electromagnetic sensor are collectively disposed in the array, the array being substantially lateral to a direction of travel along the rail.

20. A computer-readable medium storing instructions that, when executed by a computer, cause the computer to:
   control, at a controller, a first electromagnetic sensor, the first electromagnetic sensor being disposed along a first axis, the controller being coupled to a memory;
   control, at the controller, a second electromagnetic sensor, the second electromagnetic sensor being disposed along a second axis;
   control, at the controller, a third electromagnetic sensor, the third electromagnetic sensor being disposed along a third axis;
   control, at the controller, an electromagnetic engine configured to being mounted on a wheeled bogie assembly, the wheeled bogie assembly being configured to operate on a rail;
   control, at the controller, a plurality of electromagnetic coils comprised of a first electromagnetic coil, a second electromagnetic coil and a third electromagnetic coil, the plurality of electromagnetic coils being configured to generate an electromagnetic field, the electromagnetic field being configured to penetrate the rail and being configured to generate an eddy current when the electromagnetic engine is in motion, the first coil and the third coil being disposed along a fourth axis, the second coil being disposed along a fifth axis, the fourth axis being disposed below the fifth axis;
   measure, at the first electromagnetic sensor, a first reading of the generated electromagnetic field and the generated eddy current;
   measure, at the second electromagnetic sensor, a second reading of the generated electromagnetic field and the generated eddy current;
   measure, at the third electromagnetic sensor, a third reading of the generated electromagnetic field and the generated eddy current; and
   triangulate, at the controller, the first reading, the second reading, and the third reading to form a first signature.

* * * * *